(12) United States Patent
Watanabe et al.

(10) Patent No.: US 12,502,830 B2
(45) Date of Patent: Dec. 23, 2025

(54) THREE-DIMENSIONAL SHAPING DEVICE

(71) Applicant: SEIKO EPSON CORPORATION, Tokyo (JP)

(72) Inventors: Manabu Watanabe, Shiojiri (JP); Akihiko Tsunoya, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 95 days.

(21) Appl. No.: 18/616,774

(22) Filed: Mar. 26, 2024

(65) Prior Publication Data

US 2024/0326333 A1    Oct. 3, 2024

(30) Foreign Application Priority Data

Mar. 29, 2023    (JP) .................................. 2023-052982

(51) Int. Cl.
| | |
|---|---|
| *B29C 64/245* | (2017.01) |
| *B29C 64/393* | (2017.01) |
| *B33Y 30/00* | (2015.01) |
| *B33Y 50/02* | (2015.01) |

(52) U.S. Cl.
CPC .......... *B29C 64/245* (2017.08); *B29C 64/393* (2017.08); *B33Y 30/00* (2014.12); *B33Y 50/02* (2014.12)

(58) Field of Classification Search
None
See application file for complete search history.

(56) References Cited

U.S. PATENT DOCUMENTS

| | | | |
|---|---|---|---|
| 2018/0290398 A1* | 10/2018 | Mannella | B29C 64/40 |
| 2020/0061914 A1 | 2/2020 | Onishi | |
| 2020/0101672 A1* | 4/2020 | Watanabe | B33Y 40/00 |
| 2020/0130256 A1* | 4/2020 | Debora | B32B 3/02 |
| 2020/0376745 A1 | 12/2020 | Watanabe | |
| 2023/0061480 A1 | 3/2023 | Tsunoya | |

FOREIGN PATENT DOCUMENTS

| | | |
|---|---|---|
| JP | 2016-193559 A | 11/2016 |
| JP | 2020-029019 A | 2/2020 |
| JP | 2020-151984 A | 9/2020 |
| JP | 2020-152018 A | 9/2020 |
| JP | 2020-192777 A | 12/2020 |
| JP | 2021-094715 A | 6/2021 |
| JP | 2023-035401 A | 3/2023 |

* cited by examiner

*Primary Examiner* — Yung-Sheng M Tsui
(74) *Attorney, Agent, or Firm* — WORKMAN NYDEGGER

(57) ABSTRACT

A three-dimensional shaping device includes a stage having a shaping surface formed with a first, second, third, and fourth groove, a discharge unit configured to supply a shaping material to the shaping surface, a moving mechanism configured to relatively move the stage and the discharge unit, and a control unit configured to control the discharge unit and the moving mechanism. The control unit is configured to execute a control of forming a first shaping line in the first groove, a control of forming a second shaping line in the second groove, a control of forming a third shaping line in the third groove, a control of forming a fourth shaping line in the fourth groove, a control of forming a first floor layer that couples the first and second shaping lines, and a control of forming a second floor layer that couples the third and fourth shaping lines.

6 Claims, 21 Drawing Sheets

THREE-DIMENSIONAL SHAPING DEVICE

The present application is based on, and claims priority from JP Application Serial Number 2023-052982, filed Mar. 29, 2023, the disclosure of which is hereby incorporated by reference herein in its entirety.

BACKGROUND

1. Technical Field

The present disclosure relates to a three-dimensional shaping device.

2. Related Art

Related to a three-dimensional shaping device, JP-A-2020-29019 discloses a method of forming unevenness on a shaping surface of a stage so that a shaped object is less likely to move on the shaping surface. For example, in a case where recessed portions are arranged in a lattice shape on a shaping surface, when a shaping material is discharged to the recessed portions arranged in a lattice shape, the shaping material entering the recessed portions becomes protruding portions. Accordingly, a shaped object is less likely to move by engaging the protruding portions and the recessed portions.

JP-A-2020-29019 is an example of the related art.

SUMMARY

However, for example, when a shaping material having a large shrinkage rate is used, a gap may be formed between the protruding portion and the recessed portion, and the protruding portion may come off from the recessed portion. When the protruding portion comes off from the recessed portion, it is difficult to maintain a positional relationship between the shaped object and the stage.

According to a first aspect of the present disclosure, a three-dimensional shaping device for shaping a three-dimensional shaped object is provided. The three-dimensional shaping device includes: a stage having a shaping surface formed with a first groove extending in a first direction, a second groove extending in the first direction, a third groove extending in the first direction, and a fourth groove extending in the first direction; a discharge unit configured to supply a shaping material to the shaping surface; a moving mechanism configured to move the stage and the discharge unit relative to each other; and a control unit configured to control the discharge unit and the moving mechanism, in which the second groove is formed between the first groove and the third groove in a second direction intersecting the first direction, the third groove is formed between the second groove and the fourth groove in the second direction, the control unit is configured to execute first control of forming a first shaping line by supplying the shaping material to the first groove while moving the discharge unit relative to the stage in the first direction, second control of forming a second shaping line by supplying the shaping material to the second groove while moving the discharge unit relative to the stage in the first direction, third control of forming a third shaping line by supplying the shaping material to the third groove while moving the discharge unit relative to the stage in the first direction, fourth control of forming a fourth shaping line by supplying the shaping material to the fourth groove while moving the discharge unit relative to the stage in the first direction, fifth control of forming a first floor layer that couples the first shaping line and the second shaping line by supplying the shaping material toward the shaping surface while moving the discharge unit relative to the stage, and sixth control of forming a second floor layer that couples the third shaping line and the fourth shaping line by supplying the shaping material toward the shaping surface while moving the discharge unit relative to the stage, the three-dimensional shaped object is shaped on a first underlayer and a second underlayer, the first underlayer includes the first shaping line, the second shaping line, and the first floor layer, and the second underlayer includes the third shaping line, the fourth shaping line, and the second floor layer.

According to a second aspect of the present disclosure, a three-dimensional shaping device for shaping a three-dimensional shaped object is provided. The three-dimensional shaping device includes: stage having a shaping surface; a discharge unit configured to supply a shaping material to the shaping surface; a moving mechanism configured to move the stage and the discharge unit relative to each other; and a control unit configured to control the discharge unit and the moving mechanism, in which the control unit is configured to execute control of forming a first underlayer by supplying the shaping material to the shaping surface while moving the discharge unit relative to the stage, control of forming a second underlayer by supplying the shaping material to the shaping surface while moving the discharge unit relative to the stage, control of forming a raft layer by supplying the shaping material to the first underlayer and the second underlayer while moving the discharge unit relative to the stage, and control of shaping the three-dimensional shaped object by supplying the shaping material onto the raft layer while moving the discharge unit relative to the stage.

DESCRIPTION OF EMBODIMENTS

A. First Embodiment

Figure 1:
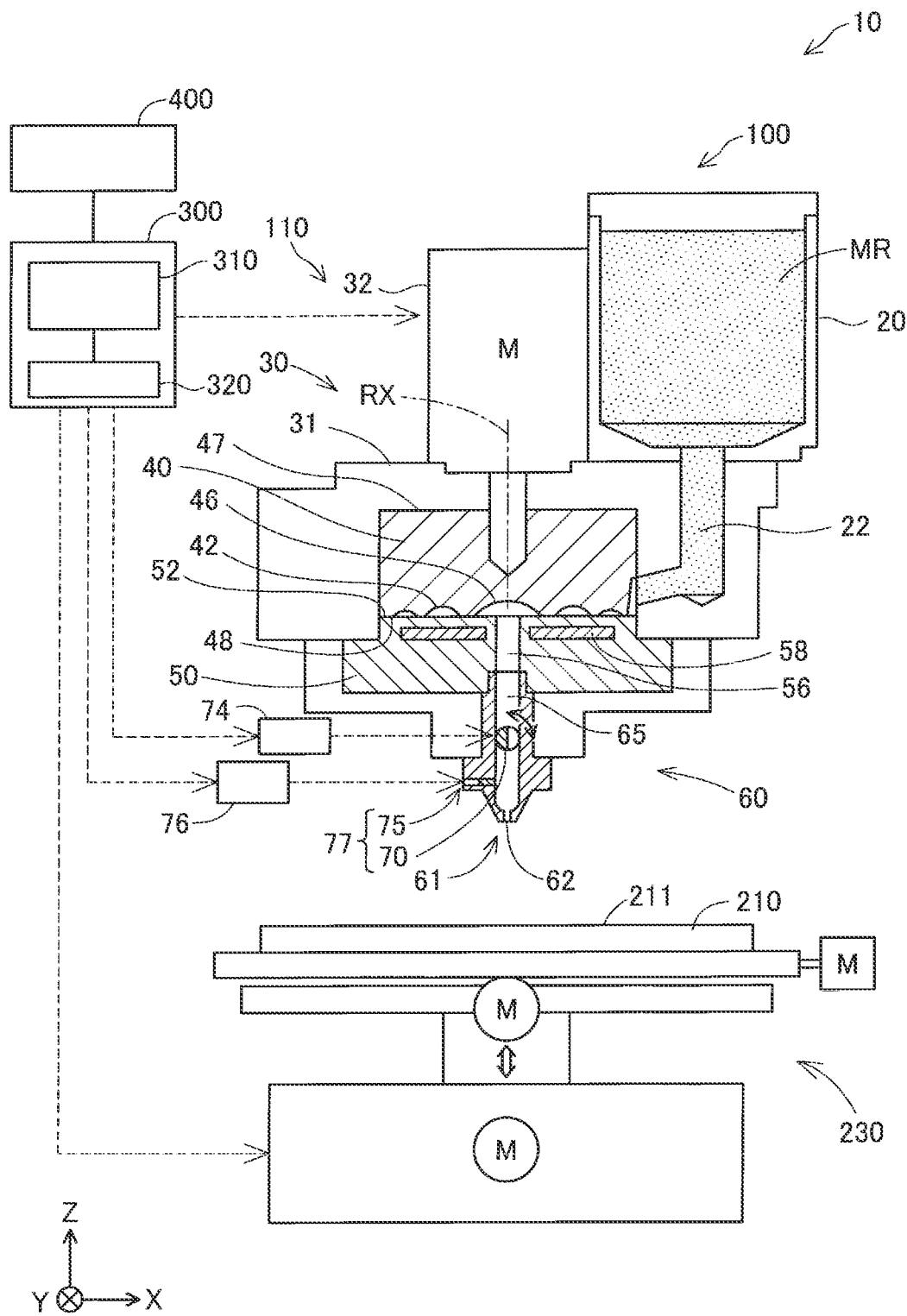
FIG. 1 is a view showing a schematic configuration of a three-dimensional shaping system according to a first embodiment.

FIG. 1 is a view showing a schematic configuration of a three-dimensional shaping system 10 according to a first embodiment. In FIG. 1, arrows indicating X, Y, and Z directions orthogonal to one another are shown. The X direction and the Y direction are parallel to a horizontal plane. The Y direction corresponds to a "first direction". The X direction corresponds to a "second direction" intersecting the first direction. The direction is a direction along a vertically upward direction. Hereinafter, a +Z direction is also referred to as "up", and a −Z direction is also referred to as "down". Arrows indicating the X, Y, and Z directions are appropriately shown in other drawings in a manner in which shown directions correspond to those in FIG. 1. In the following description, when a direction is specified, a direction indicated by an arrow in each drawing is defined as "+" and an opposite direction is defined as "−", and positive and negative signs are used in combination in a direction notation.

The three-dimensional shaping system 10 includes a three-dimensional shaping device 100 and an information processing device 400. The three-dimensional shaping device 100 according to the embodiment is a device that shapes a shaped object by a material extrusion method. The three-dimensional shaping device 100 includes a control unit 300 that controls units of the three-dimensional shaping device 100. The control unit 300 and the information processing device 400 are communicably coupled to each other.

The three-dimensional shaping device 100 includes a shaping unit 110 that generates and discharges a shaping material, a shaping stage 210 serving as a base of a shaped object, and a moving mechanism 230 that controls a discharge position of the shaping material.

The shaping discharges a shaping material obtained by plasticizing a material in a solid state toward the stage 210 under the control of the control unit 300. The shaping unit 110 includes a material supply unit 20 that is a supply source of a raw material before being converted into the shaping material, a plasticizing unit 30 that converts the raw material into the shaping material, and a discharge unit 60 that discharges the shaping material.

The material supply unit 20 supplies a raw material MR to the plasticizing unit 30. The material supply unit 20 is implemented by, for example, a hopper that accommodates the raw material MR. The material supply unit 20 is coupled to the plasticizing unit 30 via a communication path 22. The raw material MR is put into the material supply unit 20 in a form of pellets, powder, or the like.

The plasticizing unit 30 plasticizes the raw material MR supplied from the material supply unit 20 to generate shaping a paste-shaped material exhibiting fluidity, and guides the shaping material to the discharge unit 60. "Plasticize" in the embodiment is a concept including melting, and refers to changing from a solid state to a fluidity state. Specifically, for a material in which glass transition occurs, "plasticize" refers to setting a temperature of the material to a temperature equal to or higher than a glass transition point. For a material in which glass transition does not occur, "plasticize" refers to setting a temperature of the material to a temperature equal to or higher than a melting point. The shaping material may be a material containing a crystalline resin or an amorphous resin. In the embodiment, the shaping material contains a crystalline resin. Therefore, for example, a resin such as polyethylene, polypropylene, POM, and PEEK is used as the raw material MR.

The plasticizing unit 30 includes a screw case 31, a drive motor 32, a flat screw 40, and a barrel 50. The flat screw 40 is also referred to as a rotor or a scroll. The barrel 50 is also referred to as a screw facing portion.

The flat screw 40 is accommodated in the screw case 31. An upper surface 47 of the flat screw 40 is coupled to the drive motor 32, and the flat screw 40 is rotated in the screw case 31 by a rotation drive force generated by the drive motor 32. The drive motor 32 is driven under the control of the control unit 300. The flat screw 40 may be driven by the drive motor 32 via a speed reducer.

Figure 2:
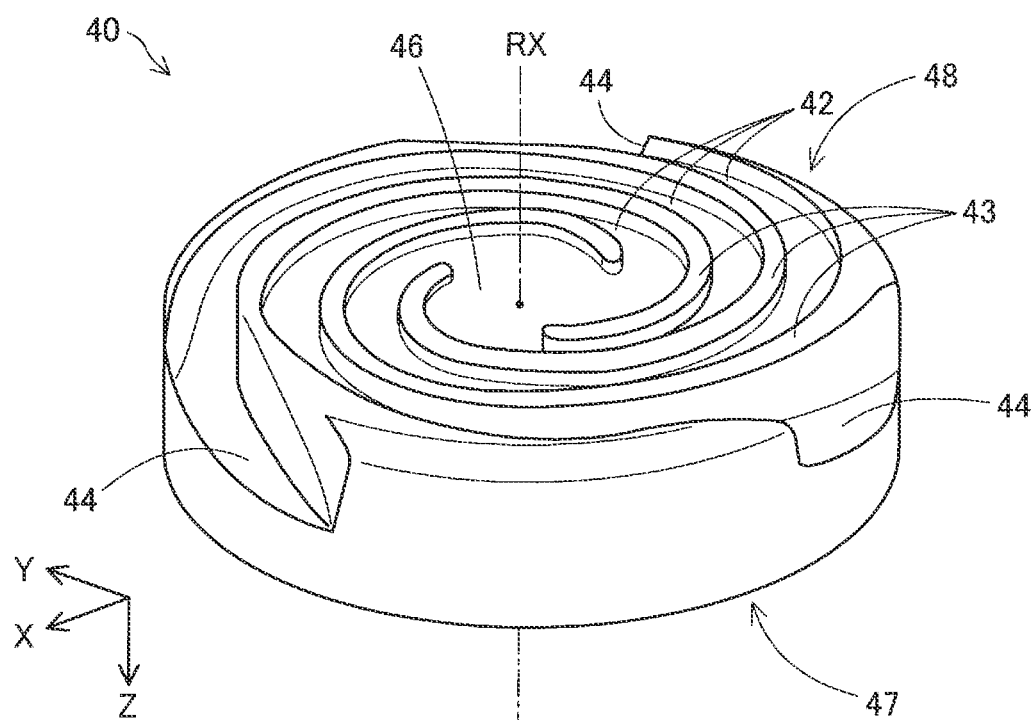
FIG. 2 is a perspective view showing a schematic configuration of a flat screw.

FIG. 2 is a perspective view showing a schematic configuration of a lower surface 48 side of the flat screw 40. The flat screw 40 shown in FIG. 2 is shown in a state where a positional relationship between the upper surface 47 and the lower surface 48 shown in FIG. 1 is reversed in a vertical direction. The flat screw 40 has a substantially cylindrical shape in which a length in an axial direction is smaller than a length in a direction perpendicular to the axial direction. The axial direction is a direction along a central axis of the flat screw 40. The flat screw 40 is disposed such that a rotation axis RX serving as a rotation center of the flat screw 40 is parallel to the Z direction.

Groove portions 42 in a vortex shape are formed in the lower surface 48 of the flat screw 40 which is a surface intersecting the rotation axis RX. The above-described communication path 22 of the material supply unit 20 communicates with the groove portions 42 from a side surface of the flat screw 40. In the embodiment, three groove portions 42 are formed in a manner of being separated by ridge portions 43. The number of the groove portions 42 is not limited to three, and may be one or two or more. A shape of the groove portion 42 is not limited to a vortex shape, and may have a spiral shape or an involute curve shape, or may have a shape extending in an arc from a central portion toward an outer periphery.

As shown in FIG. 1, the lower surface 48 of the flat screw 40 faces an upper surface 52 of the barrel 50, and a space is formed between the groove portions 42 of the lower surface 48 of the flat screw 40 and the upper surface 52 of the barrel 50. The raw material MR is supplied from the material supply unit 20 to the space between the flat screw 40 and the barrel 50 through material inlets 44 shown in FIG. 2.

A barrel heater 58 that heats the raw material MR supplied into the groove portions 42 of the flat screw 40 in rotation is embedded in the barrel 50. A communication hole 56 is formed at the center of the barrel 50.

Figure 3:
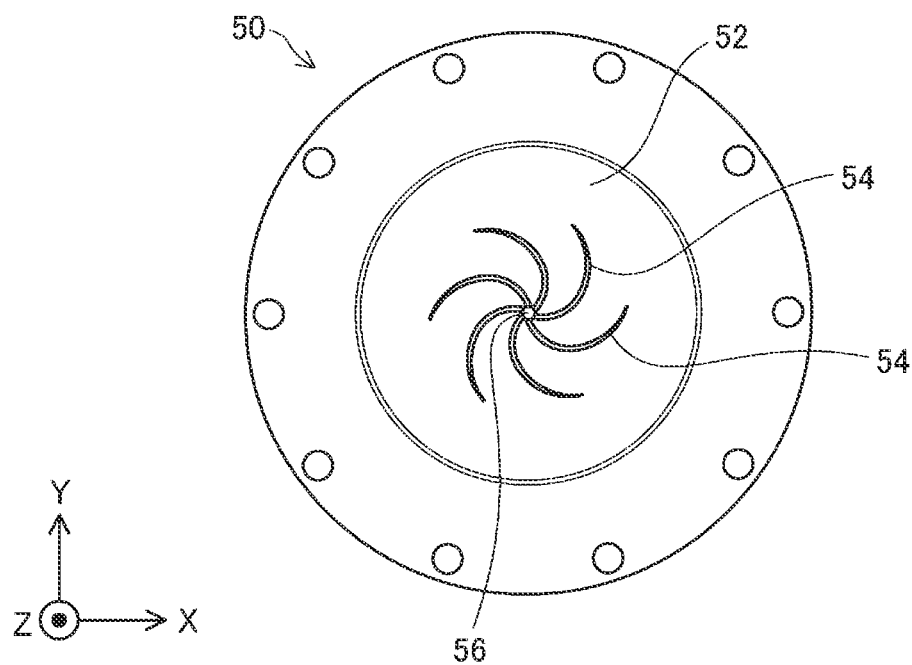
FIG. 3 is a schematic plan view showing a barrel.

FIG. 3 is a schematic plan view showing an upper surface 52 side of the barrel 50. A plurality of guide grooves 54 coupled to the communication hole 56 and extending in a vortex shape from the communication hole 56 toward an outer periphery are formed in the upper surface 52 of the barrel 50. One end of the guide groove 54 may not be coupled to the communication hole 56. The guide groove 54 may be omitted.

The raw material MR supplied into the groove portions 42 of the flat screw 40 flows along the groove portions 42 along with the rotation of the flat screw 40 while being plasticized in the groove portions 42, and the raw material MR is guided to a central portion 46 of the flat screw 40 as a shaping material. The paste-shaped shaping material that exhibits fluidity and flows into the central portion 46 is supplied to the discharge unit 60 through the communication hole 56 formed at the center of the barrel 50. In the shaping material, not all kinds of substances constituting the shaping material may be plasticized. The shaping material may be converted into a state having fluidity as a whole by plasticizing at least a part of substances constituting the shaping material.

The discharge unit 60 shown in FIG. 1 includes a nozzle 61 that discharges the shaping material, a shaping material flow path 65 formed between the flat screw 40 and a nozzle opening 62, and a discharge control unit 77 that controls discharging of the shaping material.

The nozzle 61 is coupled to the communication hole 56 of the barrel 50 through the flow path 65. The nozzle 61 discharges the shaping material generated in the plasticizing unit 30 from the nozzle opening 62 at a tip end of the nozzle 61 toward the stage 210.

The discharge control unit 77 includes a discharge adjusting unit 70 that opens and closes the flow path 65, and a suction unit 75 that suctions and temporarily stores the shaping material.

The discharge adjusting unit 70 is provided in the flow path 65, and changes an opening degree of the flow path 65 by being rotated in the flow path 65. In the embodiment, the discharge adjusting unit 70 is implemented by a butterfly valve. The discharge adjusting unit 70 is driven by a first drive unit 74 under the control of the control unit 300. The first drive unit 74 is implemented by, for example, a stepping motor. The control unit 300 can adjust a flow rate of the shaping material flowing from the plasticizing unit 30 to the nozzle 61, that is, a discharge amount of the shaping material discharged from the nozzle 61, by controlling a rotation angle of the butterfly valve using the first drive unit 74. The discharge adjusting unit 70 can adjust the discharge amount of the shaping material and can control ON and OFF of an outflow of the shaping material.

The suction unit 75 is coupled between the discharge adjusting unit 70 and the nozzle opening 62 in the flow path 65. The suction unit 75 temporarily suctions the shaping material in the flow path 65 when discharging of the shaping material from the nozzle 61 is stopped, thereby preventing a tailing phenomenon in which the shaping material drips in a manner of pulling a thread from the nozzle opening 62. In the embodiment, the suction unit 75 is implemented by a plunger. The suction unit 75 is driven by a second drive unit 76 under the control of the control unit 300. The second drive unit 76 is implemented by, for example, a stepping motor, a rack-and-pinion mechanism that converts a rotation force of the stepping motor into a translational motion of a plunger, and the like.

The stage 210 is disposed at a position facing the nozzle opening 62 of the nozzle 61. The stage 210 is disposed parallel to the X and Y directions, that is, a horizontal direction. The stage 210 has a shaping surface 211 on which a shaped object is shaped. A detailed configuration of the stage 210 will be described later.

The moving mechanism 230 changes a relative position between the stage 210 and the nozzle 61 under the control of the control unit 300. In the embodiment, a position of the nozzle 61 is fixed, and the moving mechanism 230 moves the stage 210. The moving mechanism 230 is implemented by a three-axis positioner that moves the stage 210 in three axial directions of X, Y, and Z directions by drive forces of three motors. In this specification, unless otherwise specified, moving the nozzle 61 refers to moving the nozzle 61 or the discharge unit 60 relative to the stage 210.

In another embodiment, a configuration in which the moving mechanism 230 moves the nozzle 61 relative to the stage 210 in a state in which a position of the stage 210 is fixed may be adopted instead of a configuration in which the stage 210 is moved by the moving mechanism 230. Further, a configuration in which the stage 210 is moved in the Z direction by the moving mechanism 230 and the nozzle 61 is moved in the X and Y directions or a configuration in which the stage 210 is moved in the X and Y directions by the moving mechanism 230 and the nozzle 61 is moved in the Z direction may be adopted. With such configurations, a relative positional relationship between the nozzle 61 and the stage 210 can also be changed.

The control unit 300 is a control device that controls an overall operation of the three-dimensional shaping device 100. The control unit 300 is implemented by a computer including one or more processors 310, a storage device 320 including a main storage device and an auxiliary storage device, and an input and output interface that inputs a signal from and output a signal to the outside. The processor 310 executes a program stored in the storage device 320, thereby controlling the shaping unit 110 and the moving mechanism 230 according to shaping data acquired from the information processing device 400 to shape a shaped object on the stage 210. The control unit 300 may be implemented by a combination of circuits instead of being implemented by a computer.

Figure 4:
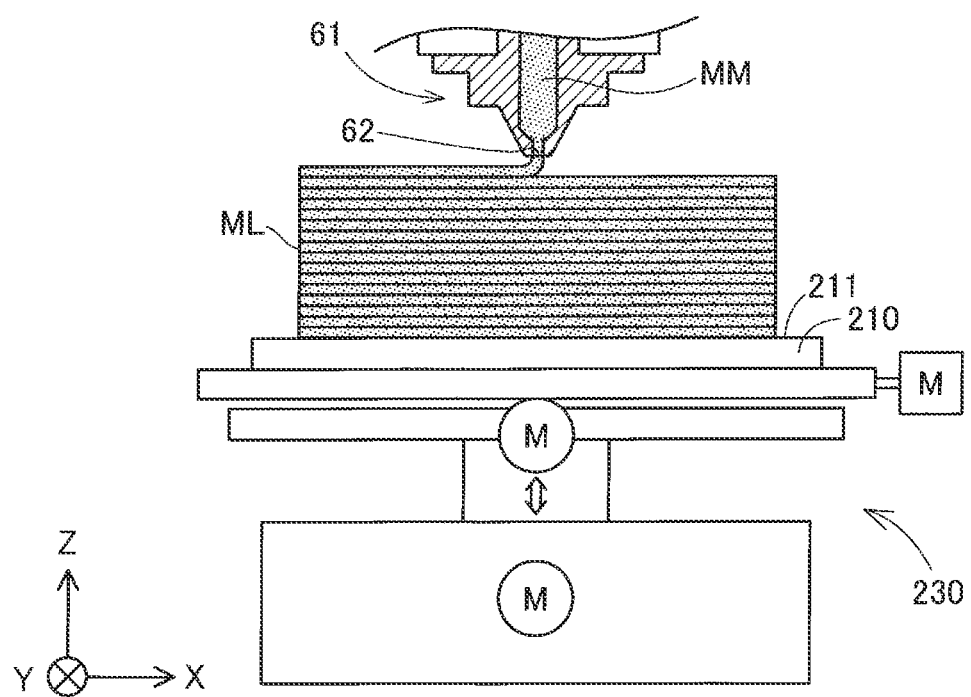
FIG. 4 is a view schematically showing a basic operation in which a three-dimensional shaping device shapes a shaped object.

FIG. 4 is a view schematically showing a basic operation in which the three-dimensional shaping device 100 shapes a shaped object. As described above, the raw material MR in a solid state is plasticized to generate a shaping material MM in the three-dimensional shaping device 100. The control unit 300 causes the nozzle 61 to discharge the shaping material MM while changing a position of the nozzle 61 relative to the stage 210 in a direction along the shaping surface 211 of the stage 210 and maintaining a distance between the shaping surface 211 of the stage 210 and the nozzle 61. The shaping material MM discharged from the nozzle 61 is continuously stacked in a moving direction of the nozzle 61.

The control unit 300 forms layers ML by repeating a movement of the nozzle 61. After forming one layer ML, the control unit 300 moves a position of the nozzle 61 relative to the stage 210 in the Z direction. Then, a layer ML is further stacked on the layer ML that has been formed so far, thereby forming a shaped object.

For example, the unit may control 300 temporarily interrupt a movement of the nozzle 61 in the Z direction when the layer ML for one layer is completed, or temporarily interrupt discharging of the shaping material from the nozzle 61 when there are a plurality of independent shaping regions in each layer. In this case, the flow path 65 is closed by the discharge adjusting unit 70, discharging of the shaping material MM from the nozzle opening 62 is stopped, and the shaping material in the nozzle 61 is temporarily suctioned by the suction unit 75. After the control unit 300 changes a position of the nozzle 61, the discharge adjusting unit 70 opens the flow path 65 while discharging the shaping material in the suction unit 75, thereby restarting stacking of the shaping material MM from a changed position of the nozzle 61.

Figure 5:
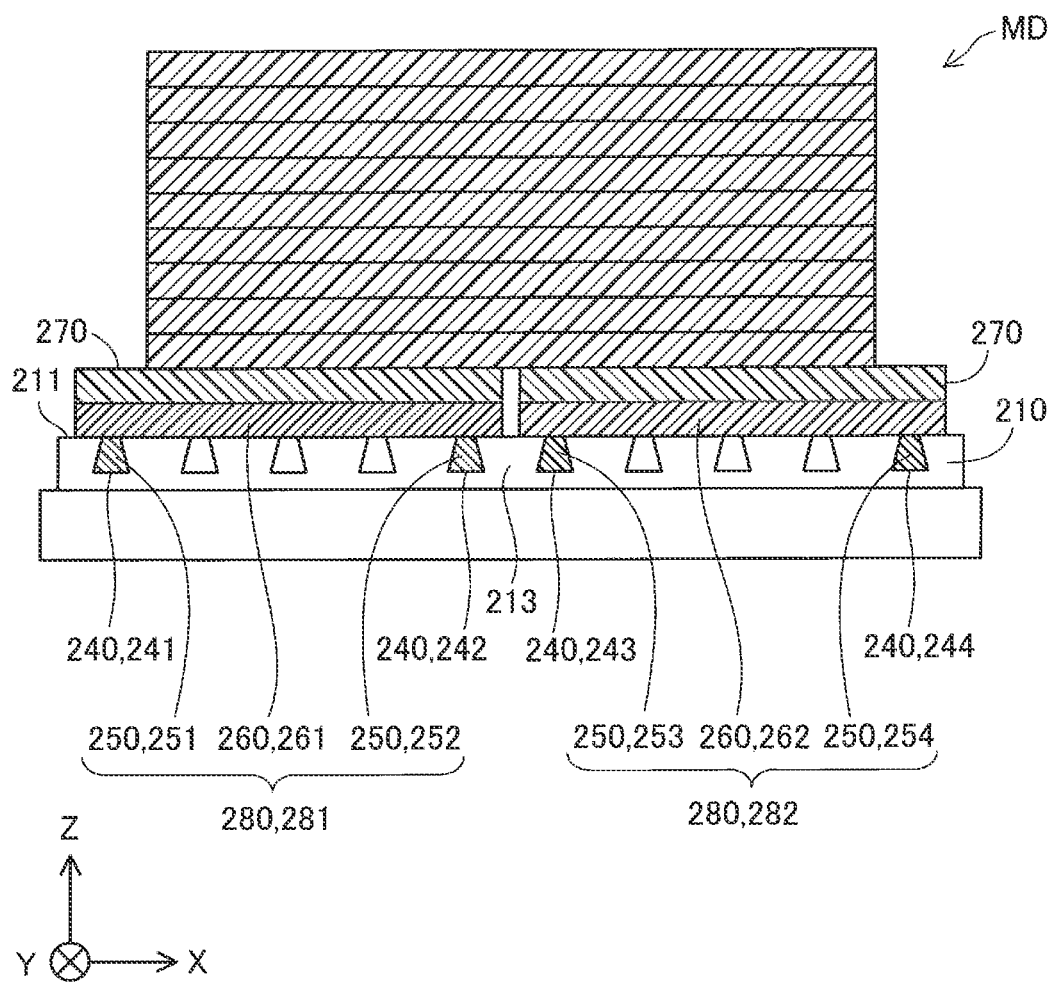
FIG. 5 is a view schematically showing a cross-sectional structure of a stage and a three-dimensional shaped object.
Figure 6:
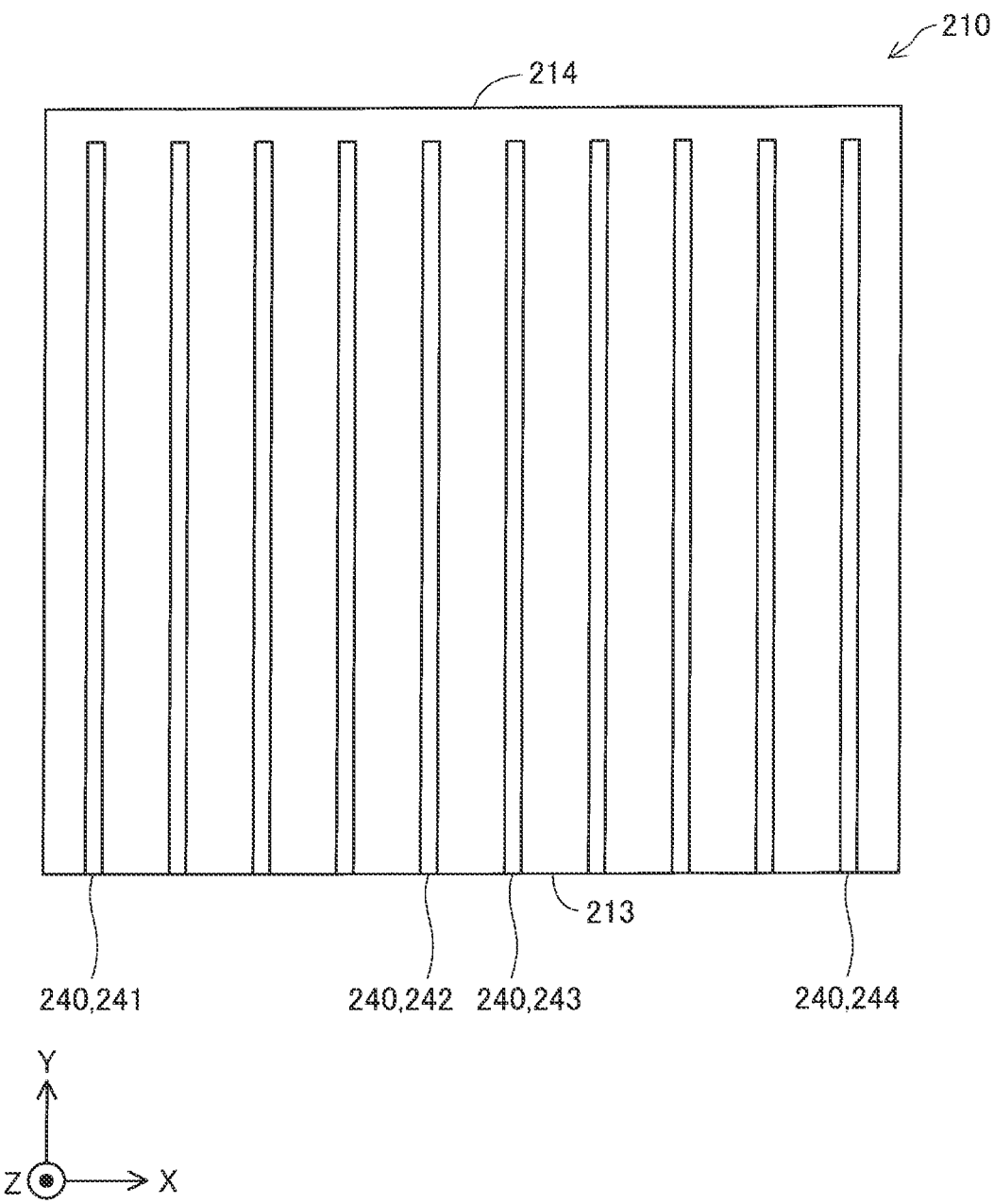
FIG. 6 is a plan view showing the stage.

FIG. 5 is a view schematically showing a cross-sectional structure of the stage 210 and a three-dimensional shaped object MD according to the first embodiment. FIG. 6 is a plan view showing the stage 210. The stage 210 is formed of, for example, aluminum, stainless steel, or glass. The shaping surface 211 of the stage 210 has a plurality of grooves 240. FIGS. 5 and 6 show an example in which ten grooves 240 are formed in the shaping surface 211. The plurality of grooves 240 include a first groove 241, a second groove 242, a third groove 243, and a fourth groove 244. The first groove 241, the second groove 242, the third groove 243, and the fourth groove 244 each extend in the Y direction. The second groove 242 is formed between the first groove 241 and the third groove 243 in the X direction. The third groove 243 is formed between the second groove 242 and the fourth groove 244 in the X direction. In the embodiment, the first groove 241 is located farthest in the −X direction among all of the grooves 240. The fourth groove 244 is located farthest in the +X direction among all of the grooves 240. The second groove 242 and the third groove 243 are adjacent to each other. The plurality of grooves 240 are formed between the first groove 241 and the second groove 242. The plurality of grooves 240 are formed between the third groove 243 and the fourth groove 244.

The stage 210 has a first side surface 213 that intersects the shaping surface 211 and faces the −Y direction. One end of each groove 240 is opened in the first side surface 213. The stage 210 has a second side surface 214 that intersects the shaping surface 211 and faces the +Y direction. The other end of each groove 240 is not opened to the second side surface 214.

A cross-sectional shape of each groove 240 is a trapezoidal shape. An angle between the shaping surface 211 and a wall surface of each groove 240 is, for example, 70 degrees or more and less than 90 degrees. A groove width of each groove 240 in the shaping surface 211 is larger than a diameter of the nozzle opening 62. Therefore, the shaping material discharged from the nozzle 61 is easily injected into each groove 240. The groove width is, for example, 0.1 mm to 0.5 mm.

As shown in FIG. 5, the shaping material is supplied from the discharge unit 60 to each of the first groove 241, the second groove 242, the third groove 243, and the fourth groove 244, thereby forming linear layers referred to as shaping lines 250 in the embodiment. The shaping line is also referred to as a beam layer. The shaping line 250 formed in the first groove 241 is referred to as a first shaping line 251. The shaping line 250 formed in the second groove 242 is referred to as a second shaping line 252. The shaping line 250 formed in the third groove 243 is referred to as a third shaping line 253. The shaping line 250 formed in the fourth groove 244 is referred to as a fourth shaping line 254.

The shaping material is supplied from the discharge unit 60 toward the shaping surface 211, and a floor layer 260 is formed on the shaping lines 250. The floor layer 260 includes a first floor layer 261 and a second floor layer 262. The first floor layer 261 couples the first shaping line 251 and the second shaping line 252. The second floor layer 262 couples the third shaping line 253 and the fourth shaping line 254. In the embodiment, the first floor layer 261 and the second floor layer 262 are formed on the same plane and do not come into contact with each other.

The three-dimensional shaped object MD is formed on an underlayer 280. The underlayer 280 includes a first underlayer 281 and a second underlayer 282. The first underlayer 281 includes the first shaping line 251, the second shaping line 252, and the first floor layer 261. The second underlayer 282 includes the third shaping line 253, the fourth shaping line 254, and the second floor layer 262.

In the embodiment, raft layers 270 that come into contact with the three-dimensional shaped object MD at an upper side are formed on the first floor layer 261 and the second floor layer 262 by supplying the shaping material from the discharge unit 60 toward the shaping surface 211. The raft layer 270 is a layer for enhancing adhesion between the three-dimensional shaped object MD and the underlayer 280.

Figure 7:
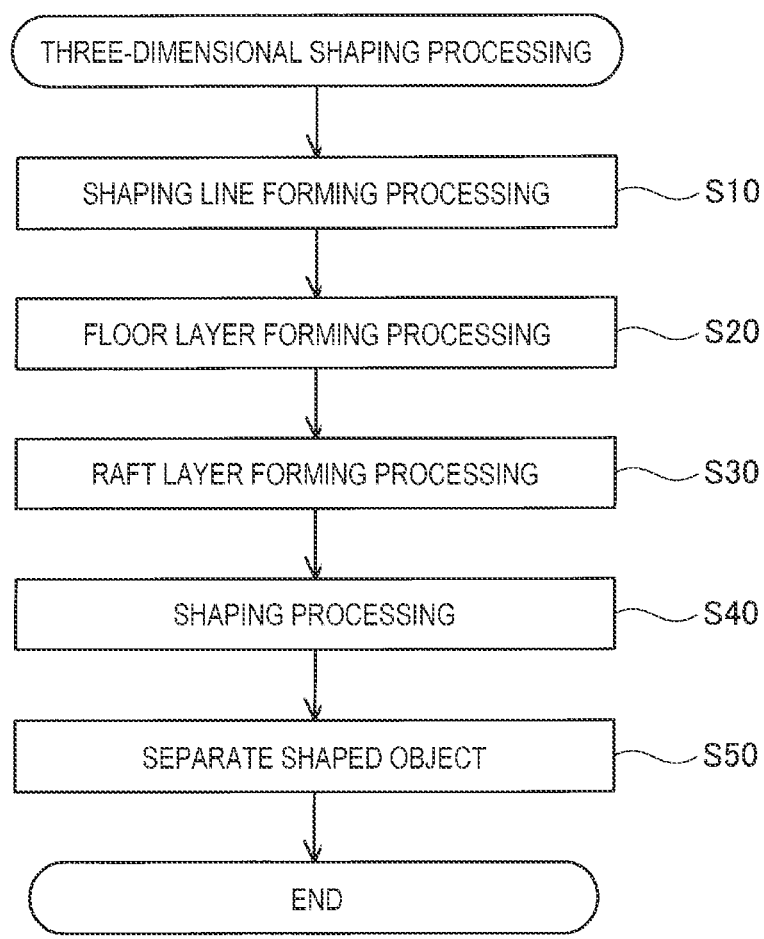
FIG. 7 is a flowchart showing three-dimensional shaping processing.

FIG. 7 is a flowchart showing three-dimensional shaping processing. The three-dimensional shaping processing is executed by the control unit 300 of the three-dimensional shaping device 100. A three-dimensional shaped object manufacturing method is achieved by executing the three-dimensional shaping processing.

In step S10, the control unit 300 controls the discharge unit 60 and the moving mechanism 230 to execute shaping line forming processing. In the shaping line forming processing, the control unit 300 forms the shaping lines 250 shown in FIG. 5 by causing the discharge unit 60 to discharge the shaping material.

Figure 8:
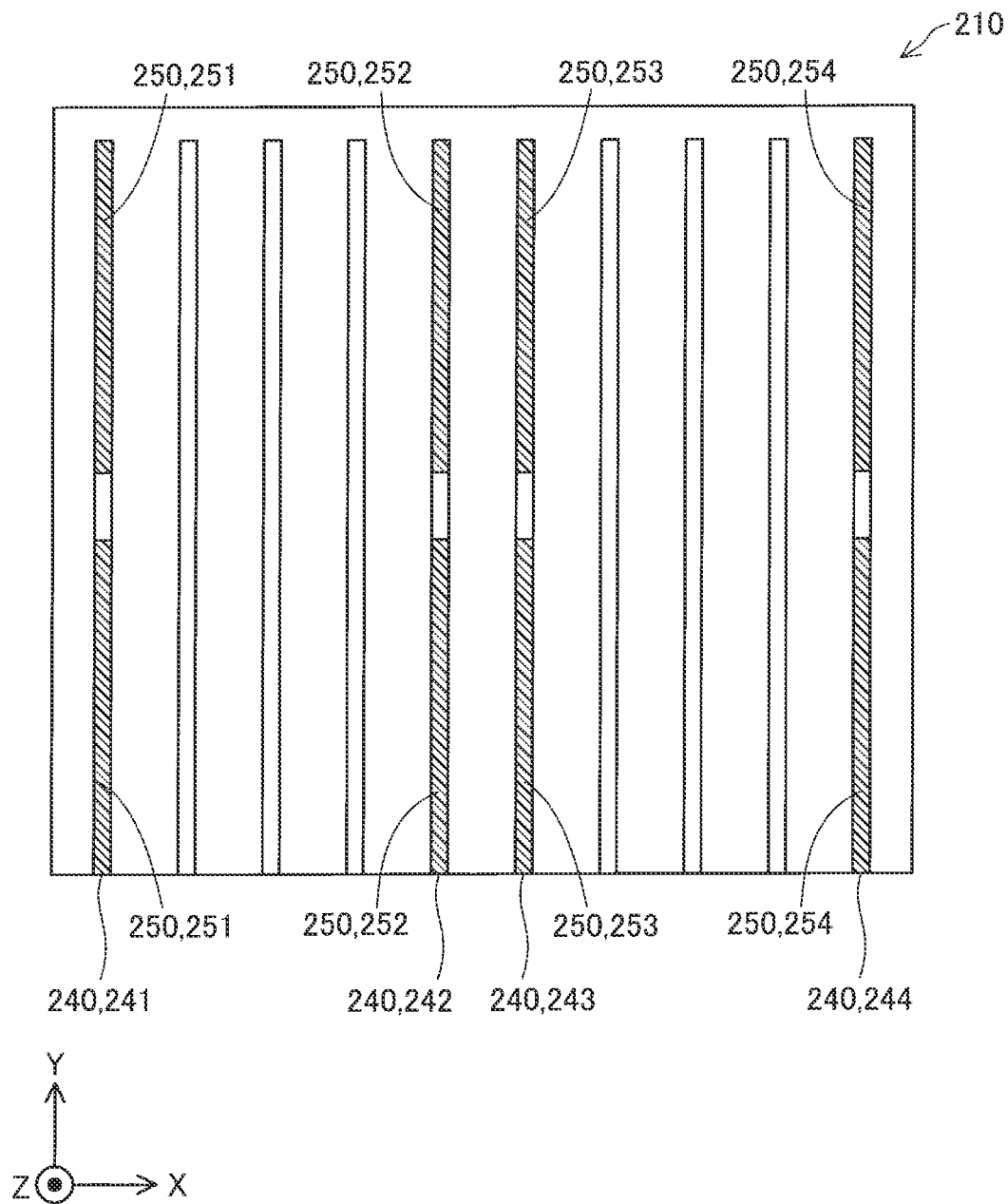
FIG. 8 is a view showing shaping line forming processing.

FIG. 8 is a view showing the shaping line forming processing. The control unit 300 executes first control, second control, third control, and fourth control in the shaping line forming processing. The first control is control of forming the first shaping line 251 by supplying the shaping material to the first groove 241 while moving the discharge unit 60 relative to the stage 210 in the Y direction. The second control is control of forming the second shaping line 252 by supplying the shaping material to the second groove 242 while moving the discharge unit 60 relative to the stage 210 in the Y direction. The third control is control of forming the third shaping line 253 by supplying the shaping material to the third groove 243 while moving the discharge unit 60 relative to the stage 210 in the Y direction. The fourth control is control of forming the fourth shaping line 254 by supplying the shaping material to the fourth groove 244 while moving the discharge unit 60 relative to the stage 210 in the Y direction.

During the execution of the first control to the fourth control, the discharge unit 60 keeps a distance between the nozzle 61 and the shaping 211 at constant, and supplies the shaping material to the first groove 241 to the fourth groove 244 in a manner in which the shaping material rises in the +Z direction from the shaping surface 211. In this manner, it is possible to prevent a tip end of the nozzle 61 from coming into contact with the shaping surface 211, and the shaping lines 250 disposed in the grooves 240 easily come into contact with the floor layer 260 stacked on the shaping lines 250.

In the embodiment, the control unit 300 temporarily stops the supply of the shaping material in the middle of moving the discharge unit 60 in the Y direction in the first control to the fourth control described above. Thus, the first shaping line 251, the second shaping line 252, the third shaping line 253, and the fourth shaping line 254 are each divided into two in the Y direction.

In step S20 shown in FIG. 7, the control unit 300 controls the discharge unit 60 and the moving mechanism 230 to execute floor layer forming processing. In the floor layer forming processing, the control unit 300 forms the floor layer 260 shown in FIG. 5 by causing the discharge unit 60 to discharge the shaping material.

Figure 9:
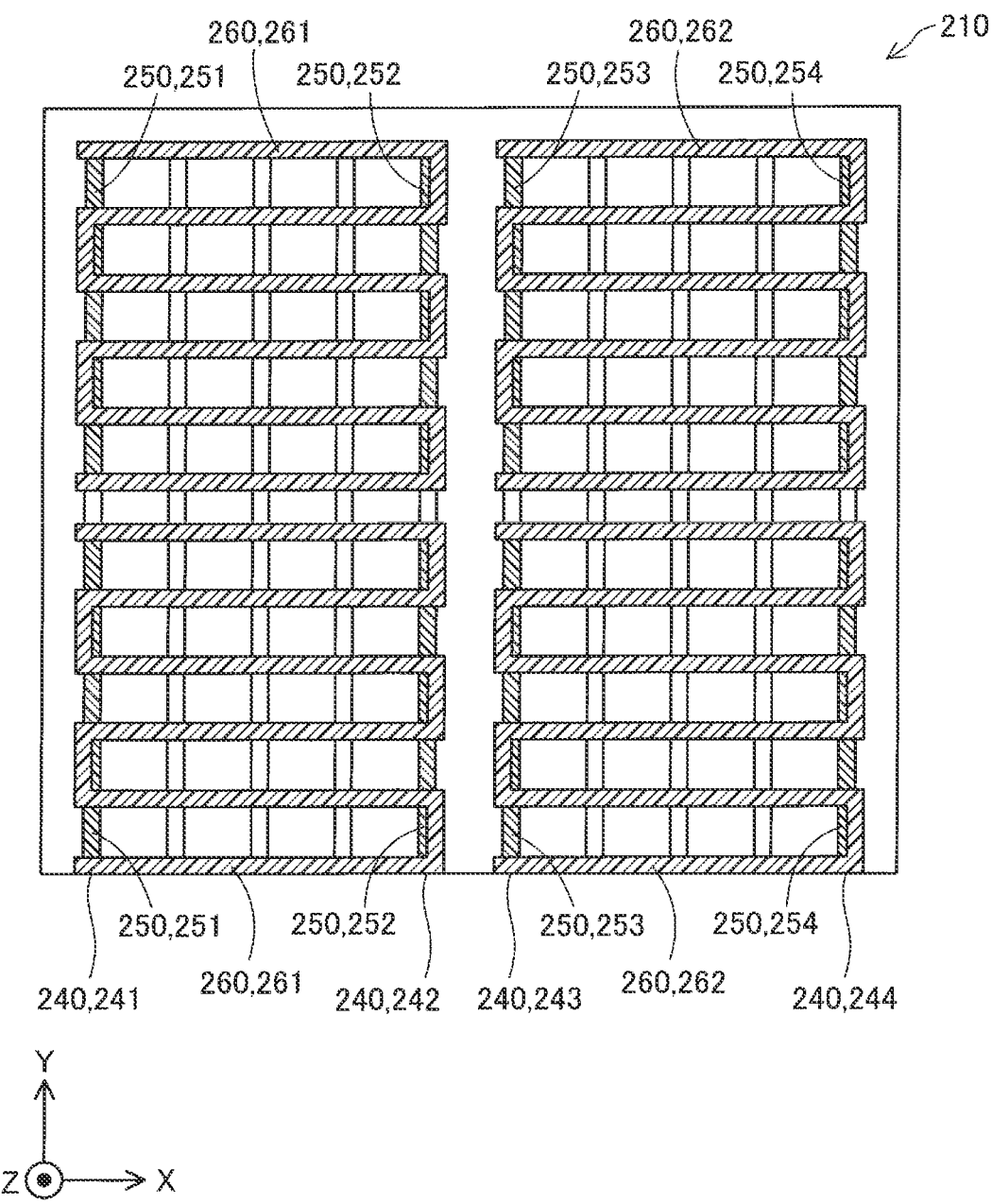
FIG. 9 is a view showing floor layer forming processing.

FIG. 9 is a view showing the floor layer forming processing. The control unit 300 executes fifth control and sixth control in the floor layer forming processing. The fifth control is control of forming the first floor layer 261 that couples the first shaping line 251 and the second shaping line 252 by supplying the shaping material toward the shaping surface 211 while moving the discharge unit 60 relative to the stage 210. The sixth control is control of forming the second floor layer 262 that couples the third shaping line 253 and the fourth shaping line 254 by supplying the shaping material toward the shaping surface 211 while moving the discharge unit 60 relative to the stage 210.

In the embodiment, the control unit 300 causes the discharge unit 60 to discharge the shaping material while reciprocating along the X direction from a position on the first shaping line 251 to a position on the second shaping line 252 in the fifth control. At this time, the control unit 300 moves the discharge unit 60 in the −Y direction every time one forward movement or return movement is completed. In this manner, the first floor layer 261 is formed on the stage 210. The first shaping line 251 and the second shaping line 252 are each divided into two pieces in the Y direction. Therefore, the control unit 300 forms the first floor layer 261 in a manner of separating the first floor layer 261 into two pieces in the Y direction in the fifth control.

In the sixth control, the control unit 300 causes the discharge unit 60 to discharge the shaping material while reciprocating along the X direction from a position on the third shaping line 253 to a position on the fourth shaping line 254. At this time, the control unit 300 moves the discharge unit 60 in the −Y direction every time one forward movement or return movement is completed. In this manner, the second floor layer 262 is formed on the stage 210. The third shaping line 253 and the fourth shaping line 254 are divided into two pieces in the Y direction. Therefore, the control unit 300 forms the second floor layer 262 in a manner of separating the second floor layer 262 into two pieces in the Y direction in the sixth control.

Although there is a gap between the shaping materials along the X direction in FIG. 9, the floor layer 260 may be shaped without generating a gap. A moving direction of the discharge unit 60 at the time of forming the floor layer 260 is not limited to the X direction orthogonal to the Y direction in which the shaping line 250 extends, and may be a direction intersecting the Y direction.

The first floor layer 261 and the second floor layer 262 are each formed of one or a plurality of layers. For example, through the fifth control and the sixth control described above, the control unit 300 forms lowermost layers of the first floor layer 261 and the second floor layer 262, and then repeatedly forms layers by gradually moving the discharge unit 60 in the +Z direction, thereby forming the first floor layer 261 and the second floor layer 262 including a plurality of layers.

When the floor layer 260 is formed of a plurality of layers, the control unit 300 may change an infill ratio or an infill pattern of each layer every time the discharge unit 60 is moved in the +Z direction. The infill ratio refers to a ratio of an area of a portion where the shaping material is discharged relative to an entire area of a layer. The infill pattern is a pattern of a path embedded inside a layer.

By executing steps S10 and S20 described above, the first underlayer 281 including the first shaping line 251, the second shaping line 252, and the first floor layer 261 is formed, and the second underlayer 282 including the second shaping line 252 and the second floor layer 262 is formed.

In step S30 shown in FIG. 7, the control unit 300 controls the discharge unit 60 and the moving mechanism 230 to execute raft layer forming processing. In the raft layer forming processing, the control unit 300 forms the raft layers 270 shown in FIG. 5 by causing the discharge unit 60 to discharge the shaping material.

Figure 10:
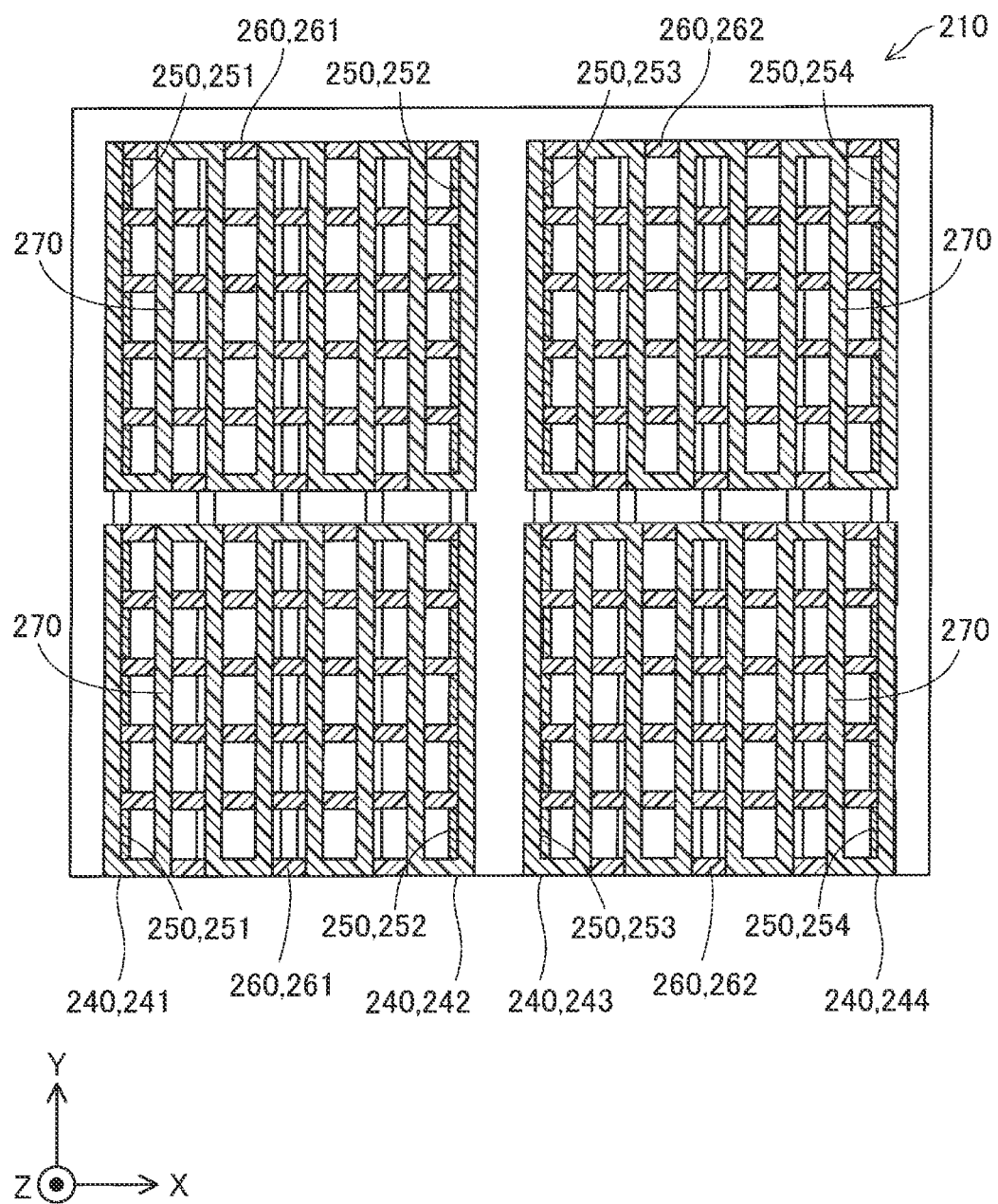
FIG. 10 is a view showing raft layer forming processing.

FIG. 10 is a view showing the raft layer forming processing. The control unit 300 executes seventh control in the raft layer forming processing. The seventh control is processing of forming the raft layers 270 that come into contact with the three-dimensional shaped object MD by supplying the shaping material toward the shaping surface 211 while moving the discharge unit 60 relative to the stage 210. In the embodiment, the raft layers 270 are formed at positions corresponding to the first floor layer 261 and the second floor layer 262. Therefore, a total of four raft layers 270 correspond to the two first floor layers 261 and the two second floor layers 262 in FIG. 10. Similarly to the floor layer 260, the raft layer 270 is formed of one or more layers.

In step S40 shown in FIG. 7, the control unit 300 controls the discharge unit 60 and the moving mechanism 230 to execute shaping processing.

Figure 11:
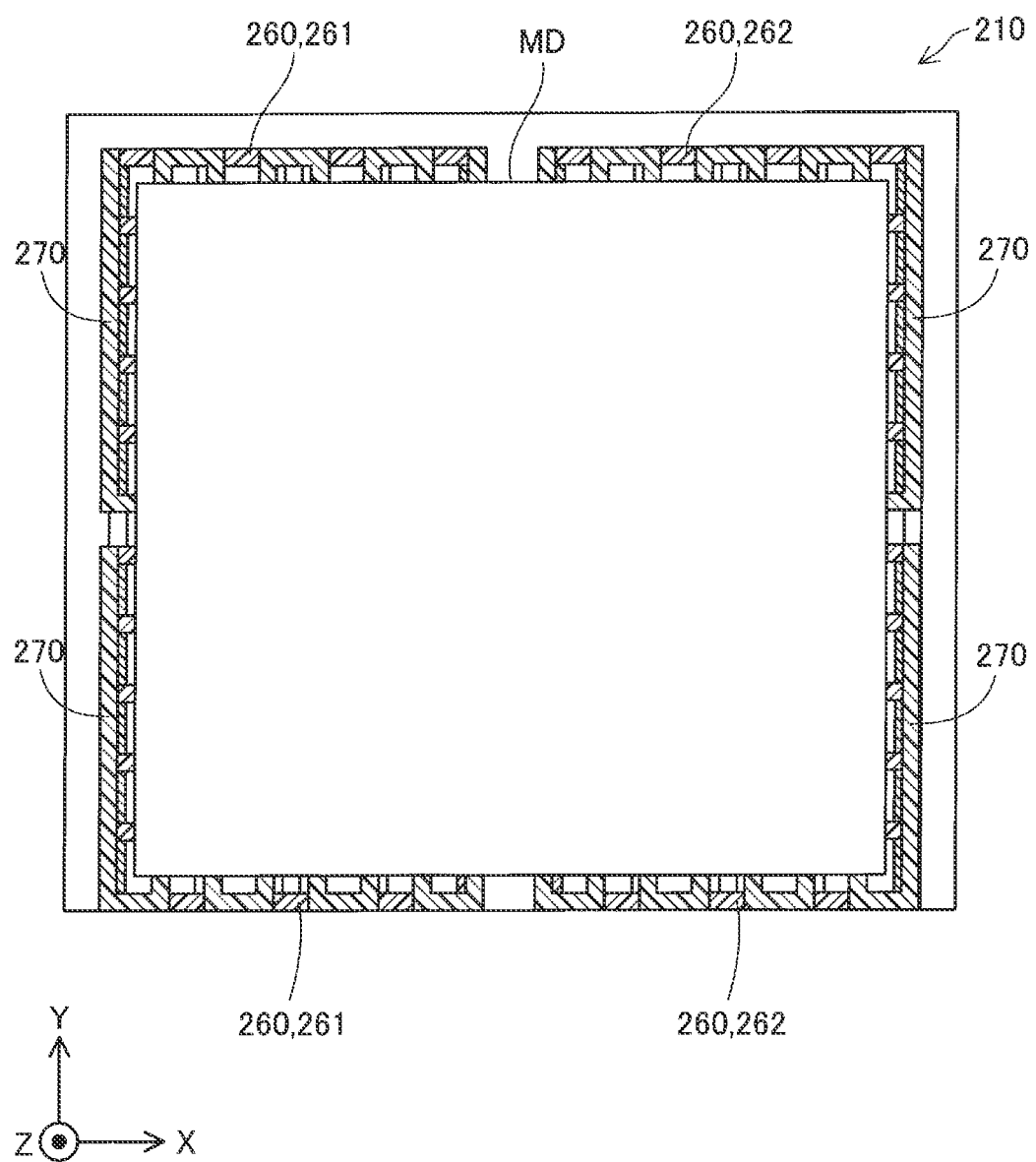
FIG. 11 is a view showing shaping processing.

FIG. 11 is a view showing the shaping processing. In the shaping processing, the control unit 300 executes control of shaping the three-dimensional shaped object MD by supplying the shaping material onto the raft layer 270 and stacking layers while moving the discharge unit 60 relative to the stage 210 according to the shaping data acquired from the information processing device 400.

After the three-dimensional shaped object MD is shaped, the three-dimensional shaped object MD and the raft layer 270 are separated from the underlayer 280 in step S50. The three-dimensional shaped object MD and the raft layer 270 are separated from the underlayer 280 by, for example, milling. The underlayer 280 from which the three-dimensional shaped object MD and the raft layer 270 are separated can be repeatedly used in subsequent three-dimensional shaping processing. Therefore, once the underlayer 280 is formed, the three-dimensional shaping processing shown in FIG. 7 can omit processing in step S10 and step S20.

According to the first embodiment described above, since the underlayer 280 at which the three-dimensional shaped object MD is shaped is divided into the first underlayer 281 and the second underlayer 282, a warpage amount of each of the underlayers 280 can be reduced. Therefore, even when a shrinkage rate of the shaping material is large, the shaping line 250 which is a part of the underlayer 280 is prevented from coming off from the groove 240 of the stage 210 due to the warpage of the underlayer 280, and a positional relationship between a shaped object and the stage 210 is easily maintained. As a result, the three-dimensional shaped object MD can be accurately shaped. Since the underlayer 280 is less likely to come off from the stage 210, it is easy to reuse the underlayer 280.

Since the underlayer 280 includes the shaping line 250 fitted into the groove 240 at both ends in the X direction in the embodiment, the floor layer 260 is less likely to be peeled off from the shaping surface 211 even when the underlayer 280 contracts as the underlayer 280 is cooled. In particular, since a cross-sectional shape of the groove 240 is a trapezoidal shape and an angle formed by the shaping surface 211 and a wall surface of the groove 240 is less than 90 degrees in the embodiment, the shaping line 250 is less likely to come off from the groove 240, and warpage of the floor layer 260 can be effectively prevented.

Since the raft layer 270 is formed between the underlayer 280 and the three-dimensional shaped object MD in the embodiment, adhesion between the three-dimensional shaped object MD and the underlayer 280 can be enhanced. For example, when the raft layer 270 is formed at a position corresponding to a corner portion of a bottom surface of the three-dimensional shaped object MD, the corner portion of the bottom surface of the three-dimensional shaped object MD can be prevented from n being peeled off from the underlayer 280.

The first floor layer 261 and the second floor layer 262 are formed on the same plane, and the first floor layer 261 and the second floor layer 262 do not come into contact with each other in the embodiment. Therefore, a possibility that the floor layers 260 are warped can be reduced as compared with a case where the floor layers 260 come into contact with each other.

The underlayer 280 and the three-dimensional shaped object MD are both shaped by the shaping material containing a crystalline resin in the embodiment. Therefore, interlayer adhesion between the three-dimensional shaped object MD and the underlayer 280 can be enhanced.

One end of the groove 240 formed in the stage 210 is opened in the first side surface 213 of the stage 210 in the embodiment. Therefore, when reshaping the underlayer 280, the underlayer 280 can be easily removed from the stage 210 by sliding the used underlayer 280 toward a first side surface 213 side. The stage 210 may include a heater that heats the underlayer 280 in order to facilitate removal of the underlayer 280.

B. Second Embodiment

Figure 12:
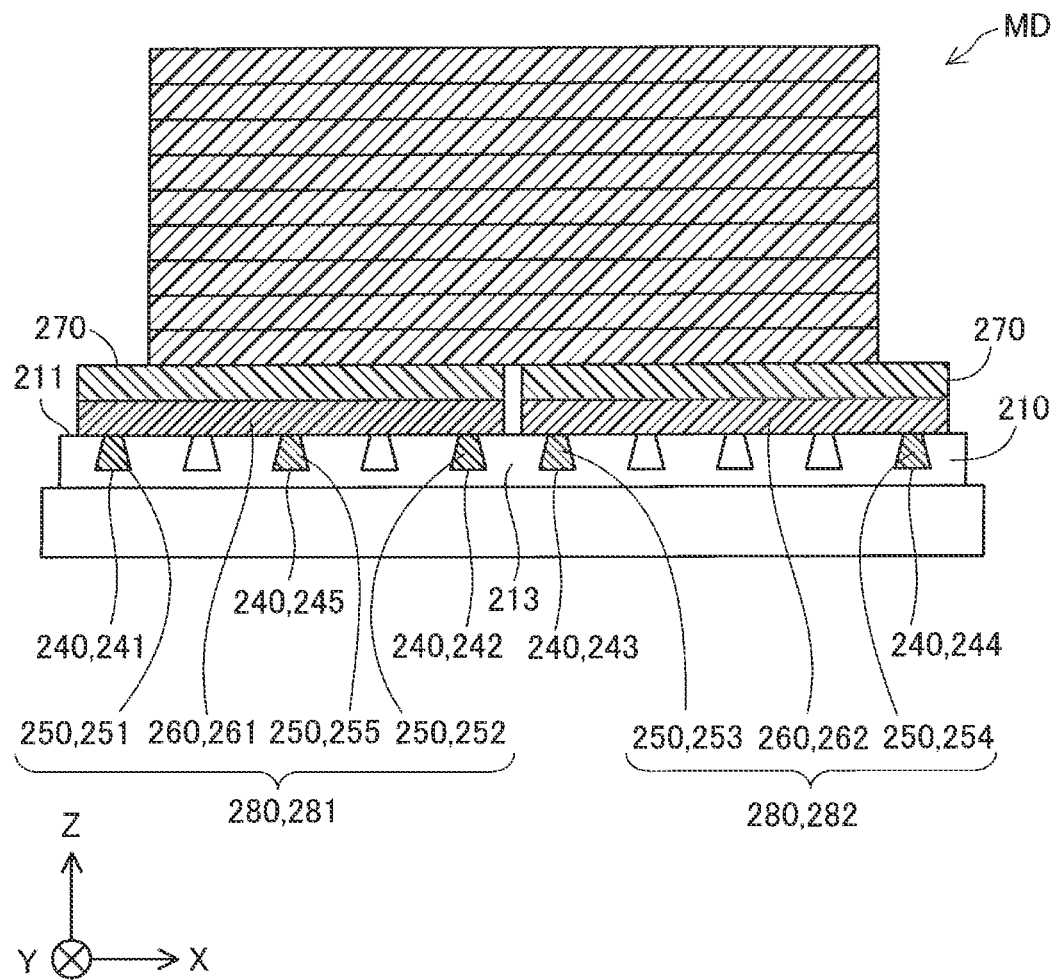
FIG. 12 is a view schematically showing a cross-sectional structure of a three-dimensional shaped object according to a second embodiment.

FIG. 12 is a view schematically showing a cross-sectional structure of the three-dimensional shaped object MD formed according to a second embodiment. In the first embodiment, the first floor layer 261 is formed on the first shaping line 251 and the second shaping line 252. On the other hand, the first floor layer 261 is formed on the first shaping line 251, the second shaping line 252, and a fifth shaping line 255 in the second embodiment. The configuration of the three-dimensional shaping device 100 in the second embodiment is the same as that in the first embodiment.

In the second embodiment, control of forming the fifth shaping line 255 by supplying the shaping material to a fifth groove 245 formed in the shaping surface 211 is executed in the shaping line forming processing in step S10 of the three-dimensional shaping processing shown in FIG. 7. The fifth groove 245 is formed between the first groove 241 and the second groove 242. The control of forming the fifth shaping line 255 is referred to as eighth control.

In the fifth control executed in the floor layer forming processing in step S20 shown in FIG. 7, the control unit 300 forms the first floor layer 261 that couples the first shaping line 251, the second shaping line 252, and the fifth shaping line 255. Since processing in steps S30 to S50 in FIG. 7 are the same as those in the first embodiment, description thereof will be omitted.

According to the second embodiment described above, the shaping line 250 is disposed not only at an end of the floor layer 260 but also in the middle of the floor layer 260. Therefore, adhesion of the floor layer 260 to the stage 210 can be further enhanced. Although the first floor layer 261 is formed on three shaping lines 250 in the second embodiment, the second floor layer 262 may also be formed on three shaping lines 250. The number of the shaping lines 250 that come into contact with the floor layer 260 is not limited to two or three, and may be four or more.

C. Third Embodiment

Figure 13:
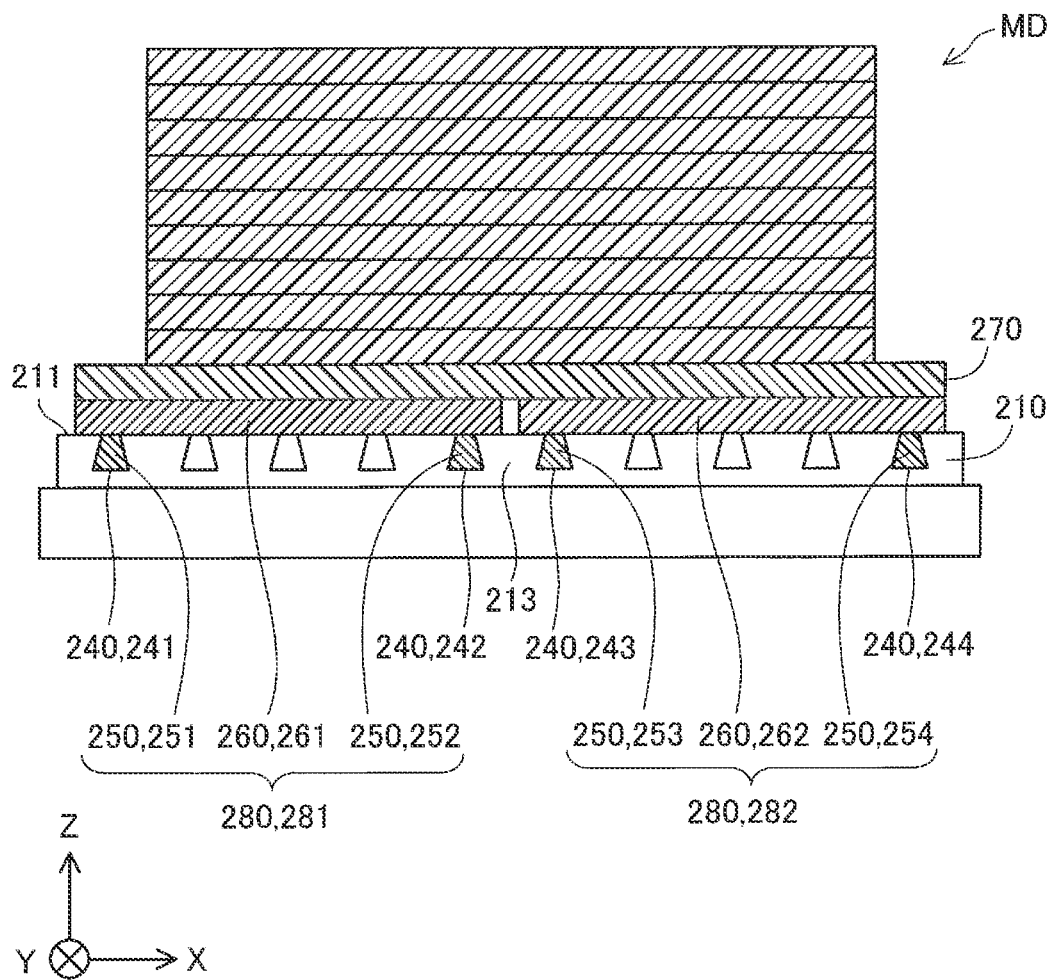
FIG. 13 is a view schematically showing a cross-sectional structure of a three-dimensional shaped object according to a third embodiment.

FIG. 13 is a view schematically showing a cross-sectional structure of a three-dimensional shaped object MD formed according to a third embodiment. In the first embodiment, a plurality of raft layers 270 correspond to a plurality of floor layers 260. On the other hand, the raft layer 270 is formed in a manner of straddling the first floor layer 261 and the second floor layer 262 in the third embodiment. The configuration of the three-dimensional shaping device 100 in the third embodiment is the same as that in the first embodiment.

Figure 14:
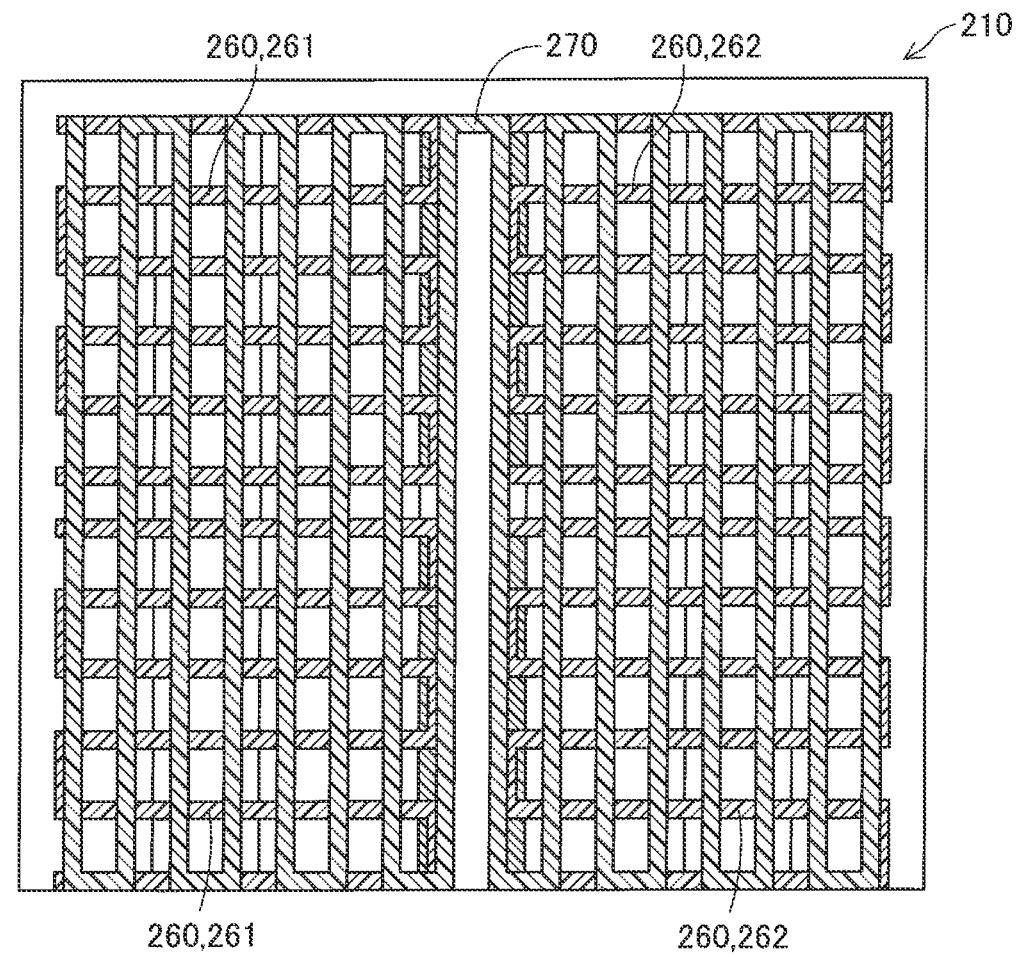
FIG. 14 is a view showing a raft layer according to the third embodiment.
Figure 15:
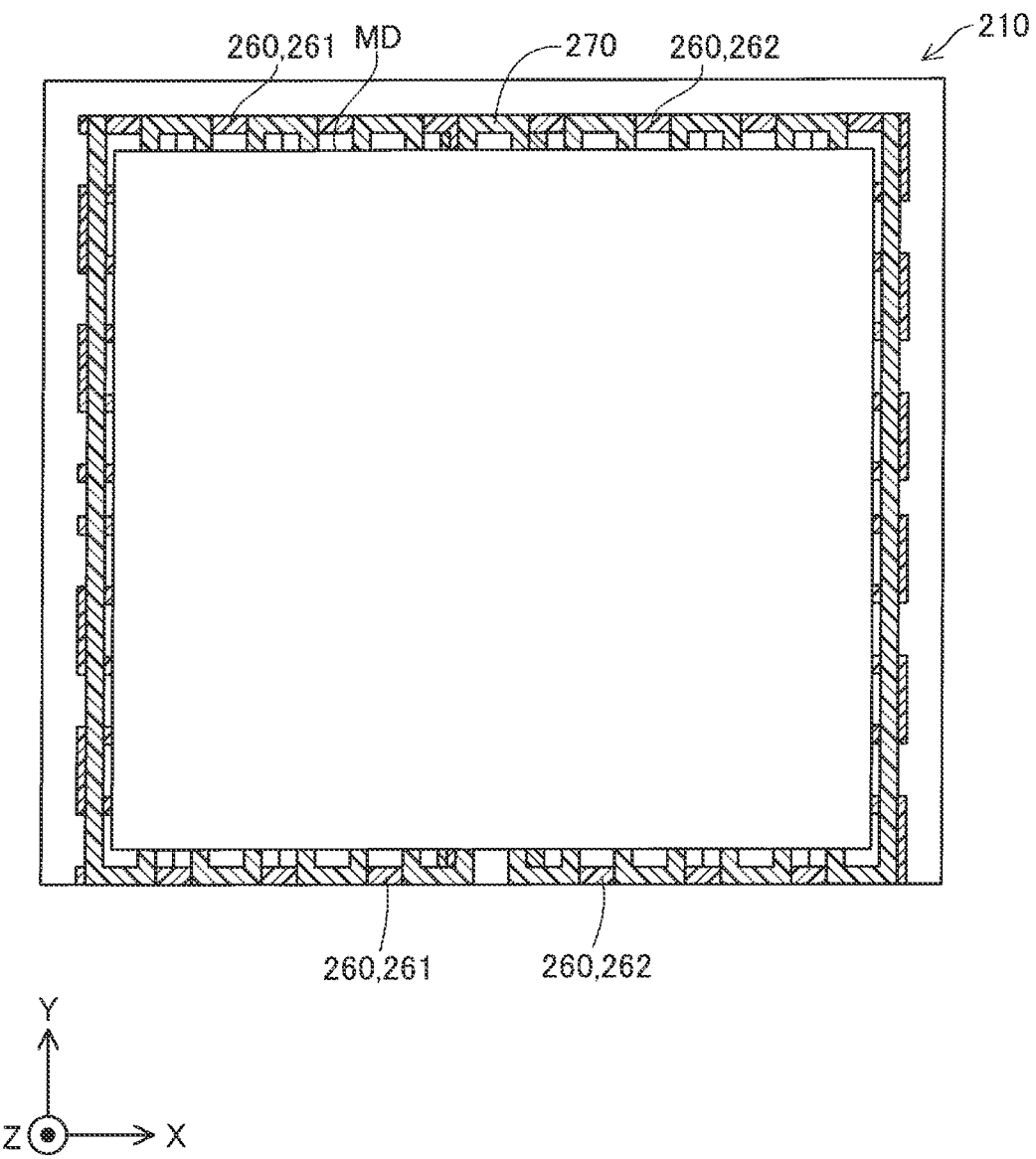
FIG. 15 is a view showing a three-dimensional shaped object according to the third embodiment.

FIG. 14 is a view showing the raft layer 270 according to the third embodiment. FIG. 15 is a view showing a three-dimensional shaped object MD according to the third embodiment. In the third embodiment, the shaping line 250 and the floor layer 260 are formed in steps S10 and S20 of the three-dimensional shaping processing shown in FIG. 5 in a similar manner to those in the first embodiment. On the other hand, the raft layer 270 is formed in a manner of straddling the first floor layer 261 and the second floor layer 262 in the raft layer forming processing in step S30, as shown in FIG. 14. Then, in the shaping processing in step S40, the three-dimensional shaped object MD is formed on the raft layer 270 formed in a manner of straddling the first floor layer 261 and the second floor layer 262, as shown in FIG. 15.

According to the third embodiment described above, since the raft layer 270 is formed in a manner of straddling a plurality of floor layers 260, an area in which the raft layer 270 comes into contact with a bottom surface of the three-dimensional shaped object MD increases. Therefore, shaping accuracy of the bottom surface of the three-dimensional shaped object MD is improved.

D. Fourth Embodiment

Figure 16:
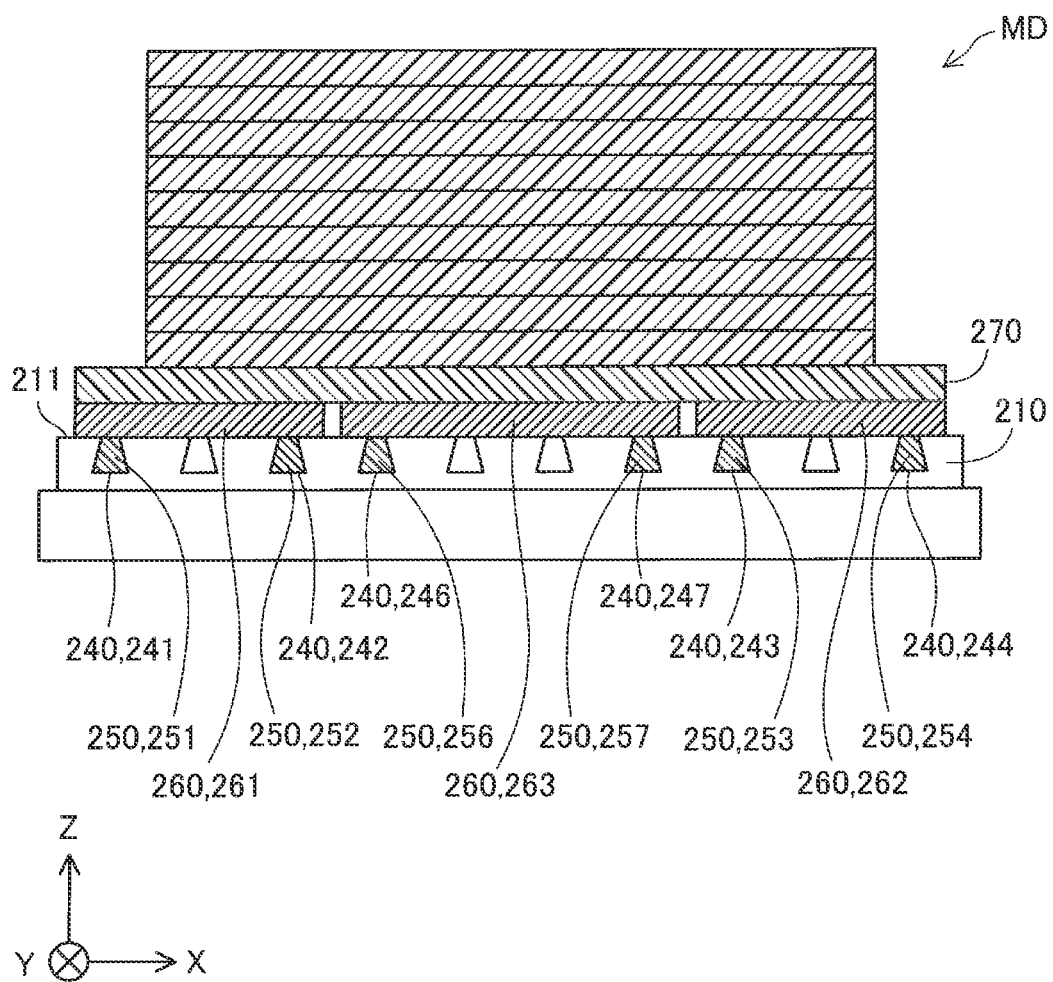
FIG. 16 is a view schematically showing a cross-sectional structure of a three-dimensional shaped object according to a fourth embodiment.

FIG. 16 is a view schematically showing a cross-sectional structure of a three-dimensional shaped object MD formed according to a fourth embodiment. In the first embodiment, the floor layer 260 is separated into the first floor layer 261 and the second floor layer 262. On the other hand, the floor layer 260 is separated into the first floor layer 261, the second floor layer 262, and a third floor layer 263 in the fourth embodiment. The configuration of the three-dimensional shaping device 100 in the fourth embodiment is the same as that in the first embodiment. In the fourth embodiment, a sixth shaping line 256 and a seventh shaping line 257 are formed in a sixth groove 246 and a seventh groove 247, in addition to the first shaping line 251, the second shaping line 252, the third shaping line 253, and the fourth shaping line 254. The sixth groove 246 and the seventh shaping line 257 are formed between the second groove 242 and the third groove 243.

Figure 17:
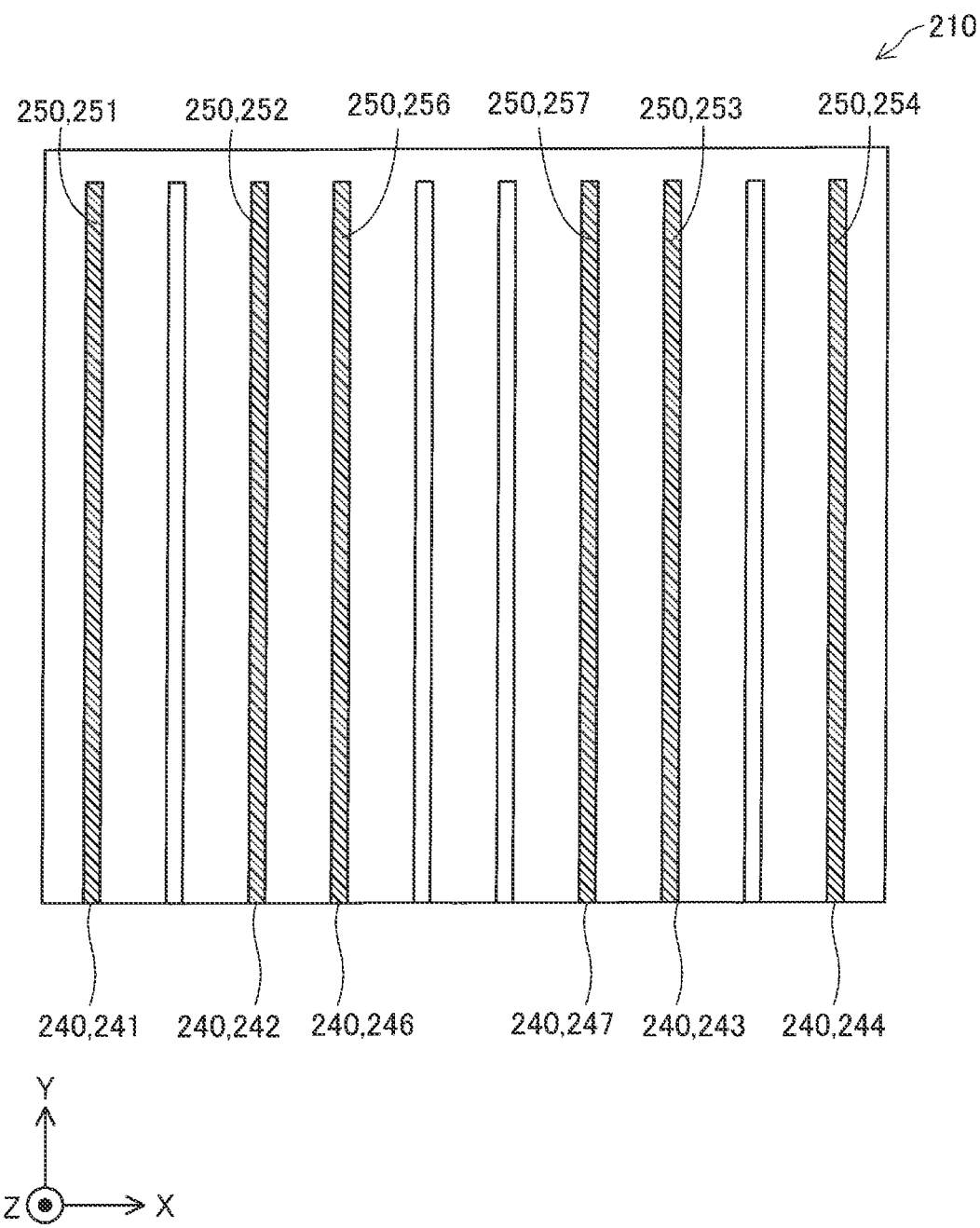
FIG. 17 is a view showing shaping lines according to the fourth embodiment.
Figure 18:
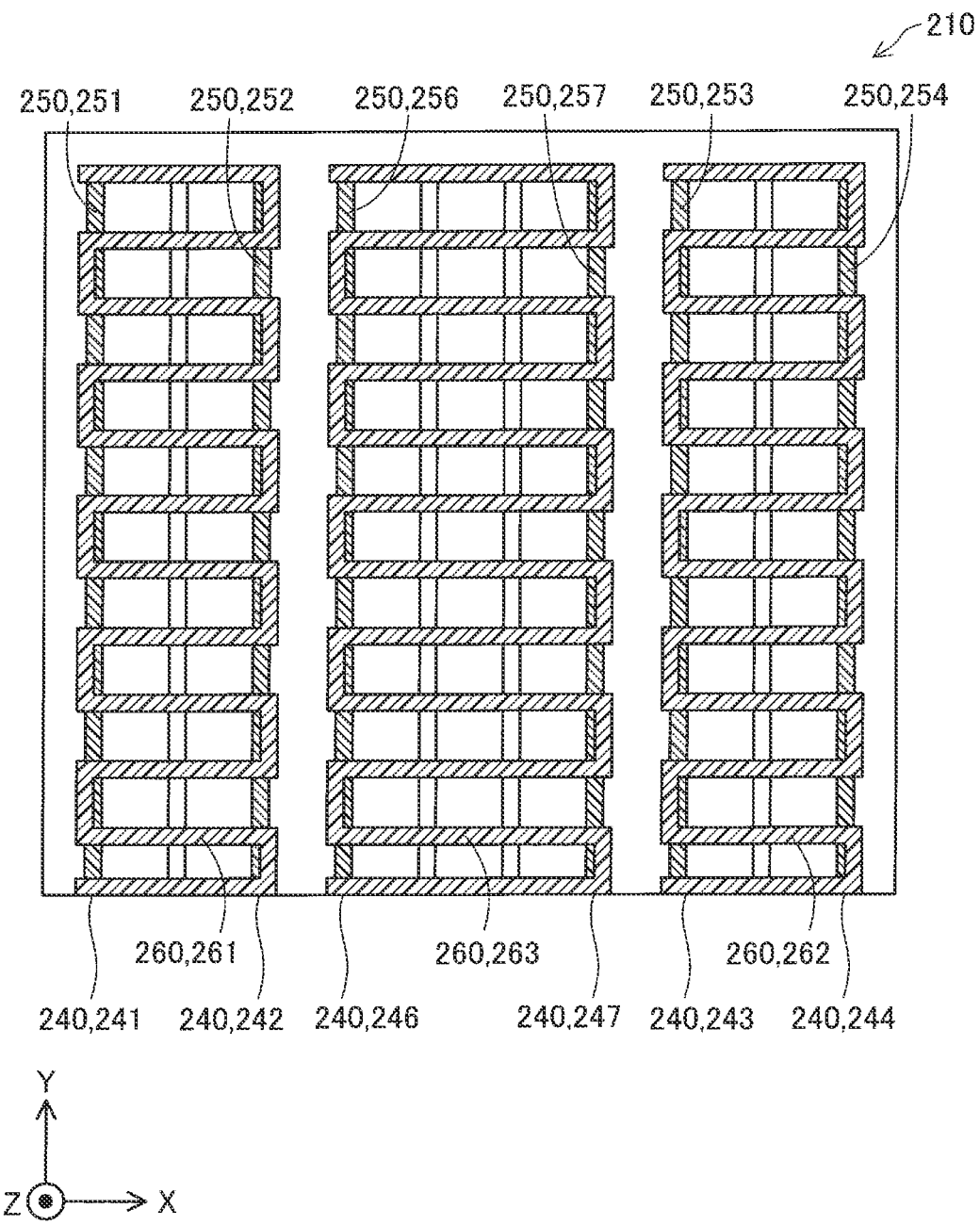
FIG. 18 is a view showing floor layers according to the fourth embodiment.
Figure 19:
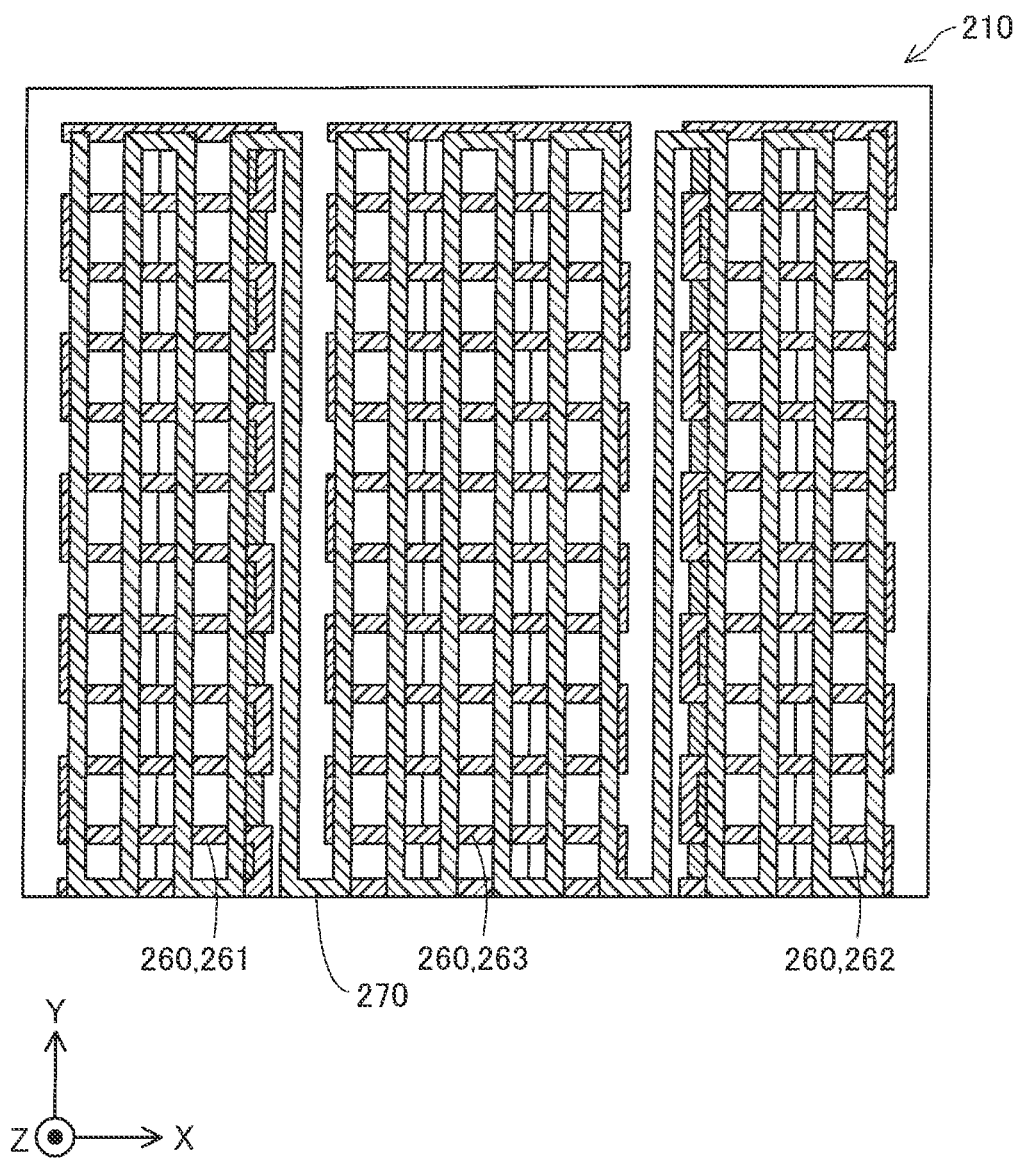
FIG. 19 is a view showing a raft layer according to the fourth embodiment.
Figure 20:
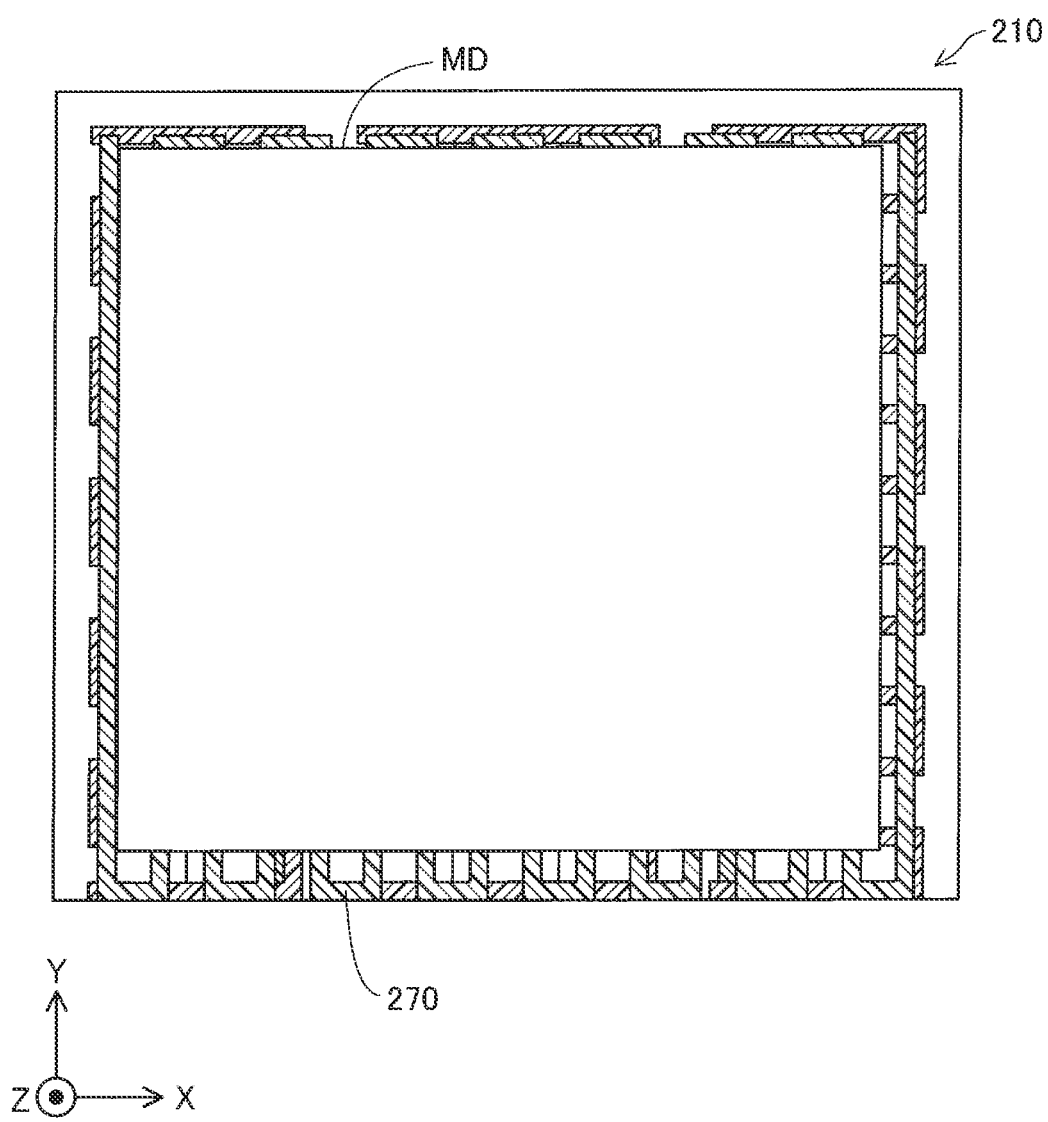
FIG. 20 is a view showing a three-dimensional shaped object according to the fourth embodiment.

FIG. 17 is a view showing the shaping lines 250 according to the fourth embodiment. FIG. 18 is a view showing the floor layers 260 according to the fourth embodiment. FIG. 19 is a view showing the raft layer 270 according to the fourth embodiment. FIG. 20 is a view showing a three-dimensional shaped object MD according to the fourth embodiment.

In the fourth embodiment, in the shaping line forming processing in step S10 of the three-dimensional shaping processing shown in FIG. 5, the shaping material is supplied to the first groove 241, the second groove 242, the third groove 243, the fourth groove 244, the sixth groove 246, and the seventh groove 247, and the first shaping line 251, the second shaping line 252, the third shaping line 253, the fourth shaping line 254, the sixth shaping line 256, and the seventh shaping line 257 are formed, as shown in FIG. 17. Different from the first shaping line 251, the second shaping line 252, the third shaping line 253, and the fourth shaping line 254 according to the first embodiment, the shaping lines 250 according to the embodiment are not separated in the Y direction.

In the floor layer forming processing in step S20, the first floor layer 261 that couples the first shaping line 251 and the second shaping line 252, the second floor layer 262 that couples the third shaping line 253 and the fourth shaping line 254, and the third floor layer 263 that couples the sixth shaping line 256 and the seventh shaping line 257 are formed, as shown in FIG. 18. The third floor layer 263 is formed between the first floor layer 261 and the second floor layer 262.

In the raft layer forming processing in step S30, the raft layer 270 is formed in a manner of straddling all of the first floor layer 261, the second floor layer 262, and the third floor layer 263, as shown in FIG. 19. The raft layer 270 may be separated corresponding to the first floor layer 261, the second floor layer 262, and the third floor layer 263.

In the shaping processing in step S40, a three-dimensional shaped object MD is shaped on the raft layer 270 formed in step S30, as shown in FIG. 20.

According to the fourth embodiment described above, since the floor layer 260 is divided into three pieces in the X direction, a size of each floor layer 260 in the X direction can be reduced. Therefore, warpage of the floor layer 260 in the X direction can be prevented. In the fourth embodiment, the shaping line 250 is formed over the entire length of the groove 240 without being separated in the middle in the Y direction, and the floor layer 260 is formed on the shaping line 250 without being separated in the middle in the Y direction. Therefore, even when a size of the floor layer 260 in the X direction is reduced by separating the floor layer 260 into three pieces in the X direction, a contact area of the floor layer 260 with the shaping surface 211 in the Y direction can be ensured, and thus the floor layer 260 can be prevented from being easily peeled off from the shaping surface 211.

E. Fifth Embodiment

Figure 21:
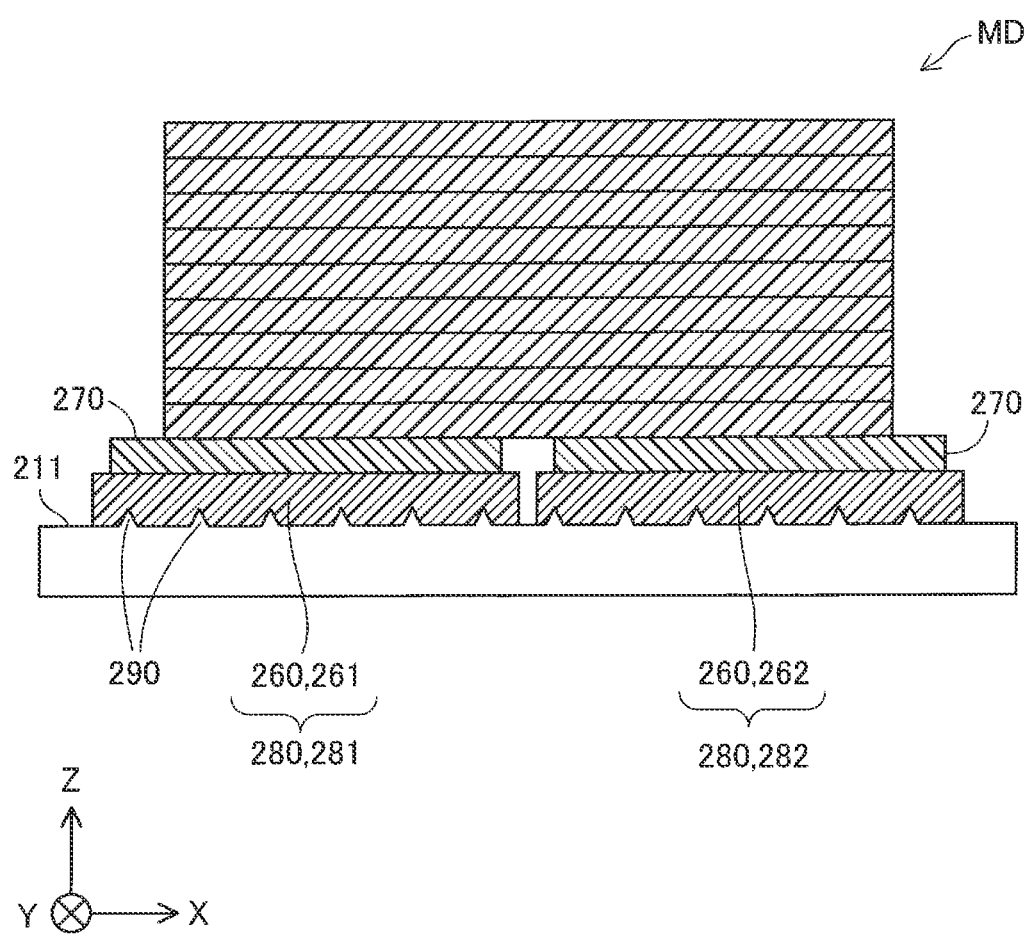
FIG. 21 is a view schematically showing a cross-sectional structure of a three-dimensional shaped object according to a fifth embodiment.

FIG. 21 is a view schematically showing a cross-sectional structure of a three-dimensional shaped object MD formed according to a fifth embodiment. In the first embodiment, a plurality of grooves 240 are formed in the shaping surface 211 of the stage 210. On the other hand, the groove 240 is not formed in the stage 210, and a plurality of protruding portions 290 extending along the Y direction are disposed in the X direction in the fifth embodiment. Therefore, the underlayer 280 is formed only by the floor layer 260, and the underlayer 280 does not include a shaping line in the fifth embodiment.

In the fifth embodiment, the shaping line forming processing in step S10 of the three-dimensional shaping processing shown in FIG. 7 is not executed, and the processing in steps S20 to S50 are executed. In the floor layer forming processing in step S20, the control unit 300 executes control to form the first floor layer 261 as the first underlayer 281 and form the first floor layer 261 as the second underlayer 282. In the raft layer forming processing in step S30, the control unit 300 executes control to form the raft layer 270 by supplying the shaping material to the first underlayer 281 and the second underlayer 282. The raft layer 270 may or may not be divided corresponding to the first underlayer 281 and the second underlayer 282. In the shaping processing in step S40, the control unit 300 executes control to shape the three-dimensional shaped object MD by supplying the shaping material onto the raft layer 270.

In the fifth embodiment described above, since the underlayer 280 is divided into the first underlayer 281 and the second underlayer 282, a warpage amount of the underlayers 280 can be reduced. Therefore, even when a shrinkage rate of the shaping material is large, the underlayer 280 is prevented from coming off from the stage 210 due to the warpage of the underlayer 280, and a positional relationship between the three-dimensional shaped object MD and the stage 210 is easily maintained. Since the three-dimensional shaped object MD can be separated from the underlayer 280 with the raft layer 270 serving as a boundary, the underlayer 280 can be repeatedly used.

F. Sixth Embodiment

Figure 22:
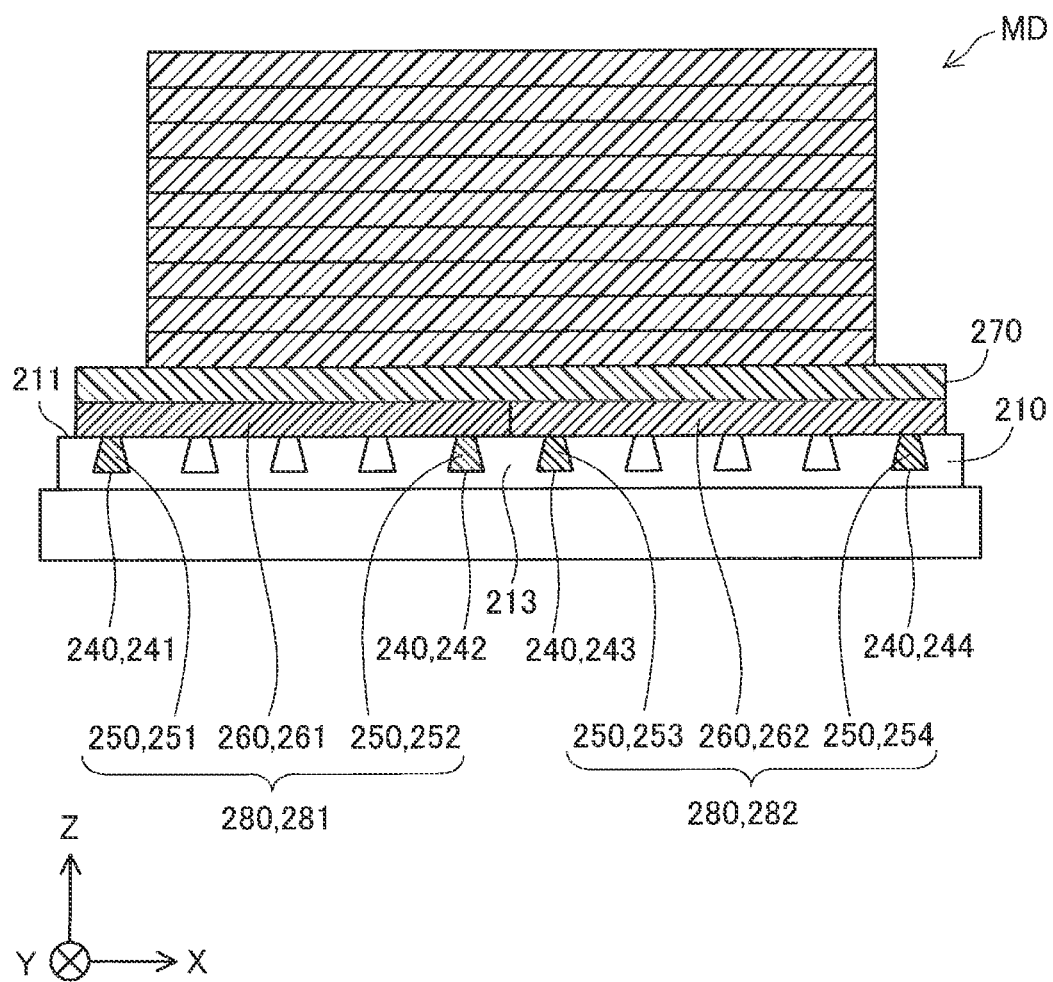
FIG. 22 is a view schematically showing a cross-sectional structure of a three-dimensional shaped object according to a sixth embodiment.

FIG. 22 is a view schematically showing a cross-sectional structure of a three-dimensional shaped object MD formed according to a sixth embodiment. In the first embodiment, the first floor layer 261 and the second floor layer 262 are formed on the same plane, and are separated from each other and do not come into contact with each other. On the other hand, the first floor layer 261 and the second floor layer 262 are formed on the same plane, and at least a part of the first floor layer 261 and a part of the second floor layer 262 come into contact with each other in the sixth embodiment. The other points are the same as those in the first embodiment.

According to the sixth embodiment described above, since at least a part of the first floor layer 261 and a part of the second floor layer 262 come into contact with each other, dimensional accuracy of a bottom surface of the three-dimensional shaped object MD at a boundary between the first floor layer 261 and the second floor layer 262 can be improved.

In embodiments described above, the underlayer 280 is not discarded in one shaping cycle, and can be commonly used in a plurality of shaping cycles. In this respect, the underlayer 280 is different from the raft layer 270 removed in one shaping cycle. In the embodiments described above, since the underlayer 280 can be reused, a consumption amount of the shaping material can be reduced as compared with a case where the underlayer 280 is shaped for each shaping cycle. Since the underlayer 280 is formed by the three-dimensional shaping device 100, the underlayer 280 is different from a component such as a shaping sheet and a shaping plate that are generally used in three-dimensional shaping. Therefore, a three-dimensional shaped object can be shaped without preparing such a component. Since a shaped object is shaped on the underlayer 280, the stage 210 is less likely to deteriorate as compared with a case where the shaped object is directly shaped on the stage 210.

G. Other Embodiments (G1) In the embodiments described above, the stage 210 may include a heater for preventing warpage of the shaping material. The heater may be divided into a plurality of regions on the stage 210. By increasing a temperature of the heater disposed in a region where warpage is likely to occur, the control unit 300 can prevent shrinkage of the shaping material on the region and prevent occurrence of warpage in the underlayer 280. The region where warpage is likely to occur is, for example, a region close to an outer periphery of the stage 210.

(G2) In the embodiments described above, one end of the groove 240 is opened in the first side surface 213 of the stage 210. On the other hand, both the one end and the other end of the groove 240 may not be opened.

(G3) In the embodiments described above, the raft layer 270 is formed in the three-dimensional shaping processing. On the other hand, the formation of the raft layer 270 may be omitted. That is, the raft layer forming processing in step S30 may be omitted in the three-dimensional shaping processing shown in FIG. 7.

H. Other Aspects

The present disclosure is not limited to the embodiments described above, and can be implemented in various aspects without departing from the gist of the present disclosure. For example, technical features of the embodiments described above corresponding to technical features in the embodiments to be described below can be replaced or combined as appropriate in order to solve a part or all of problems described above, or in order to achieve a part or all of effects described above. Technical characteristics can be deleted as appropriate unless described as essential in the present specification.

(1) According to a first aspect of the present disclosure, a three-dimensional shaping device for shaping a three-dimensional shaped object is provided. The three-dimensional shaping device includes: a stage having a shaping surface formed with a first groove extending in a first direction, a second groove extending in the first direction, a third groove extending in the first direction, and a fourth groove extending in the first direction; a discharge unit configured to supply a shaping material to the shaping surface; a moving mechanism configured to move the stage and the discharge unit relative to each other; and a control unit configured to control the discharge unit and the moving mechanism, in which the second groove is formed between the first groove and the third groove in a second direction intersecting the first direction, the third groove is formed between the second groove and the fourth groove in the second direction, the control unit is configured to execute first control of forming a first shaping line by supplying the shaping material to the first groove while moving the discharge unit relative to the stage in the first direction, second control of forming a second shaping line by supplying the shaping material to the second groove while moving the discharge unit relative to the stage in the first direction, third control of forming a third shaping line by supplying the shaping material to the third groove while moving the discharge unit relative to the stage in the first direction, fourth control of forming a fourth shaping line by supplying the shaping material to the fourth groove while moving the discharge unit relative to the stage in the first direction, fifth control of forming a first floor layer that couples the first shaping line and the second shaping line by supplying the shaping material toward the shaping surface while moving the discharge unit relative to the stage, and sixth control of forming a second floor layer that couples the third shaping line and the fourth shaping line by supplying the shaping material toward the shaping surface while moving the discharge unit relative to the stage, the three-dimensional shaped object is shaped on a first underlayer and a second underlayer, the first underlayer includes the first shaping line, the second shaping line, and the first floor layer, and the second underlayer includes the third shaping line, the fourth shaping line, and the second floor layer.

According to this aspect, since the underlayer on which the three-dimensional shaped object is shaped is divided into the first underlayer and the second underlayer, a warpage amount of each underlayer can be reduced. Therefore, even when a shrinkage rate of the shaping material is large, the shaping line which is a part of the underlayer is prevented from coming off from the groove of the stage due to the warpage of the underlayer, and a positional relationship between the three-dimensional shaped object and the stage is easily maintained.

(2) In the three-dimensional shaping device according to the above aspect, the control unit may execute seventh control of forming a raft layer that comes into contact with the three-dimensional shaped object by supplying the shaping material toward the shaping surface while moving the discharge unit relative to the stage. According to this aspect, adhesion between the three-dimensional shaped object and the underlayer can be further enhanced by the raft layer.

(3) In the three-dimensional shaping device according to the above aspect, the raft layer may be formed in a manner of straddling the first floor layer and the second floor layer. According to this aspect, since the raft layer is formed in a manner of straddling a plurality of floor layers, shaping accuracy of a bottom surface of the three-dimensional shaped object is improved.

(4) In the three-dimensional shaping device according to the above aspect, the shaping material may include a crystalline resin. According to this aspect, interlayer adhesion between the underlayer and the three-dimensional shaped object manufactured using the crystalline resin can be enhanced using the crystalline resin for the underlayer.

(5) In the three-dimensional shaping device according to the above aspect, the control unit may execute, prior to the execution of the fifth control, eighth control of forming a fifth shaping line by supplying the shaping material to a fifth groove formed between the first groove and the second groove in the second direction while moving the discharge unit relative to the stage in the first direction, and the control unit may form the first floor layer that couples the first shaping line, the second shaping line, and the fifth shaping line in the fifth control. According to this aspect, adhesion between the floor layer and the stage can be enhanced.

(6) In the three-dimensional shaping device according to the above aspect, the first floor layer and the second floor layer may be formed on the same plane, and at least a part of the first floor layer and at least a part of the second floor layer may come into contact with each other. According to this aspect, dimensional accuracy of a bottom surface of the three-dimensional shaped object can be improved at a boundary between the first floor layer and the second floor layer.

In the three-dimensional shaping device according to the above aspect, the first floor layer and the second floor layer may be formed on the same plane and may not come into contact with each other. According to this aspect, it is possible to reduce a possibility that floor layers are warped because the floor layers do not come into contact with each other.

(7) According to a second aspect of the present disclosure, a three-dimensional shaping device for shaping a three-dimensional shaped object is provided. The three-dimensional shaping device includes: a stage having a shaping surface; a discharge unit configured to supply a shaping material to the shaping surface; a moving mechanism configured to move the stage and the discharge unit relative to each other; and a control unit configured to control the discharge unit and the moving mechanism, in which the control unit is configured to execute control of forming a first underlayer by supplying the shaping material to the shaping surface while moving the discharge unit relative to the stage, control of forming a second underlayer by supplying the shaping material to the shaping surface while moving the discharge unit relative to the stage, control of forming a raft layer by supplying the shaping material to the first underlayer and the second underlayer while moving the discharge unit relative to the stage, and control of shaping the three-dimensional shaped object by supplying the shaping material onto the raft layer while moving the discharge unit relative to the stage.

According to this aspect, since the underlayer at which the three-dimensional shaped object is shaped is separated into the first underlayer and the second underlayer, a warpage amount of each underlayer can be reduced. Therefore, even when a shrinkage rate of the shaping material is large, the underlayer is prevented from coming off from the stage due to the warpage of the underlayer, and a positional relationship between the three-dimensional shaped object and the stage is easily maintained. Since the three-dimensional shaped object can be separated from the underlayer with the raft layer serving as a boundary, the underlayer can be repeatedly used.

The present disclosure is not limited to the three-dimensional shaping device described above, and can be implemented in various aspects such as a method for manufacturing a three-dimensional shaped object and a material discharge method.

What is claimed is:

1. A three-dimensional shaping device for shaping a three-dimensional shaped object, the three-dimensional shaping device comprising:
    a stage having a shaping surface formed with a first groove extending in a first direction, a second groove extending in the first direction, a third groove extending in the first direction, and a fourth groove extending in the first direction;
    a discharge unit configured to supply a shaping material to the shaping surface;
    a moving mechanism configured to move the stage and the discharge unit relative to each other; and
    a control unit configured to control the discharge unit and the moving mechanism, wherein
    the second groove is formed between the first groove and the third groove,
    the third groove is formed between the second groove and the fourth groove,
    the control unit is configured to execute
        first control of forming a first shaping line by supplying the shaping material to the first groove while moving the discharge unit relative to the stage in the first direction,
        second control of forming a second shaping line by supplying the shaping material to the second groove while moving the discharge unit relative to the stage in the first direction,
        third control of forming a third shaping line by supplying the shaping material to the third groove while moving the discharge unit relative to the stage in the first direction,
        fourth control of forming a fourth shaping line by supplying the shaping material to the fourth groove while moving the discharge unit relative to the stage in the first direction,
        fifth control of forming a first floor layer that couples the first shaping line and the second shaping line by supplying the shaping material toward the shaping surface while moving the discharge unit relative to the stage, and
        sixth control of forming a second floor layer that couples the third shaping line and the fourth shaping line by supplying the shaping material toward the shaping surface while moving the discharge unit relative to the stage,
    the three-dimensional shaped object is shaped on a first underlayer and a second underlayer,
    the first underlayer includes the first shaping line, the second shaping line, and the first floor layer, and
    the second underlayer includes the third shaping line, the fourth shaping line, and the second floor layer.

2. The three-dimensional shaping device according to claim 1, wherein
    the control unit is configured to execute seventh control of forming a raft layer that comes into contact with the three-dimensional shaped object by supplying the shaping material toward the shaping surface while moving the discharge unit relative to the stage.

3. The three-dimensional shaping device according to claim 2, wherein
    the raft layer is formed in a manner of straddling the first floor layer and the second floor layer.

4. The three-dimensional shaping device according to claim 1, wherein
    the shaping material includes a crystalline resin.

5. The three-dimensional shaping device according to claim 1, wherein
    the control unit is configured to execute, prior to the execution of the fifth control, eighth control of forming a fifth shaping line by supplying the shaping material to a fifth groove formed between the first groove and the second groove in the second direction while moving the discharge unit relative to the stage in the first direction, and
    the control unit is configured to form the first floor layer that couples the first shaping line, the second shaping line, and the fifth shaping line in the fifth control.

6. The three-dimensional shaping device according to claim 1, wherein
    the first floor layer and the second floor layer are formed on the same plane, and at least a part of the first floor layer and at least a part of the second floor layer come into contact with each other.

* * * * *